United States Patent
Bernhardsson et al.

(10) Patent No.: US 11,125,911 B2
(45) Date of Patent: Sep. 21, 2021

(54) CONTROL SYSTEM FOR MARINE VIBRATORS OPERATING NEAR IMPULSIVE SEISMIC SIGNAL SOURCES

(71) Applicant: PGS Geophysical AS, Oslo (NO)

(72) Inventors: Bo Magnus Bernhardsson, Lund (SE); Nils Gunnar Olof Kröling, Kavlinge (SE); Per Birger Gunnarsson, Löddeköpinge (SE)

(73) Assignee: PGS Geophysical AS, Oslo (NO)

( * ) Notice: Subject to any disclaimer, the term of this patent is extended or adjusted under 35 U.S.C. 154(b) by 971 days.

(21) Appl. No.: 15/109,234

(22) PCT Filed: Dec. 30, 2014

(86) PCT No.: PCT/EP2014/079487
§ 371 (c)(1),
(2) Date: Jun. 30, 2016

(87) PCT Pub. No.: WO2015/101645
PCT Pub. Date: Jul. 9, 2015

(65) Prior Publication Data
US 2016/0327663 A1 Nov. 10, 2016

Related U.S. Application Data

(60) Provisional application No. 61/921,962, filed on Dec. 30, 2013.

(51) Int. Cl.
*G10K 9/10* (2006.01)
*G01V 13/00* (2006.01)
(Continued)

(52) U.S. Cl.
CPC .............. *G01V 13/00* (2013.01); *G01V 1/143* (2013.01); *G01V 1/38* (2013.01); *G01V 1/3861* (2013.01);
(Continued)

(58) Field of Classification Search
None
See application file for complete search history.

(56) References Cited

U.S. PATENT DOCUMENTS 2,190,746 A 2/1940 Glahn
3,412,374 A * 11/1968 Mitchell ................ G01V 1/181
367/65

(Continued)

FOREIGN PATENT DOCUMENTS

| EP | 2267486 | 12/2010 |
|---|---|---|
| WO | 2014028293 | 2/2014 |
| WO | 2015/101645 | 7/2015 |

OTHER PUBLICATIONS

International Search Report and Written Opinion in Application No. PCT/EP2014/079487 dated Apr. 29, 2015, 15 pages.

(Continued)

Primary Examiner — Isam A Alsomiri
Assistant Examiner — Jonathan D Armstrong

(57) ABSTRACT

Techniques are disclosed relating to control of seismic sources such as marine vibrators. According to some embodiments, iterative learning control (ILC) systems may be used to control such seismic sources. According to some embodiments, local sensor(s) placed in, on, or near a seismic source and/or remote sensors placed in the far-field region may be used to determine a transfer function for the seismic source for such ILC control. A sensor is configured to measure the acoustic output of the marine vibrator along with signal pulses from at least one impulsive seismic signal source. The ILC is disabled when it is determined that the impulsive seismic is active based on the sensor measurements.

23 Claims, 17 Drawing Sheets

(51) Int. Cl.
*G01V 1/38* (2006.01)
*G01V 1/143* (2006.01)
G01V 1/02 (2006.01)
G01V 1/00 (2006.01)
G01V 1/145 (2006.01)
G01V 1/04 (2006.01)

(52) U.S. Cl.
CPC .............. *G01V 1/005* (2013.01); *G01V 1/04* (2013.01); *G01V 1/145* (2013.01); *G01V 1/159* (2013.01); *G01V 2210/1214* (2013.01)

(56) References Cited

U.S. PATENT DOCUMENTS

| | | | | |
|---|---|---|---|---|
| 3,716,111 | A * | 2/1973 | Lavergne | G01V 1/02 181/113 |
| 3,886,493 | A * | 5/1975 | Farr | G01V 1/04 367/189 |
| 3,895,343 | A * | 7/1975 | Farr | G01V 1/04 324/76.79 |
| 4,049,077 | A | 9/1977 | Mifsud | |
| 4,648,080 | A | 3/1987 | Hargreaves | |
| 4,692,912 | A * | 9/1987 | Mueller | G01V 1/04 181/113 |
| 5,128,900 | A | 7/1992 | Cole | |
| 5,163,028 | A * | 11/1992 | Barr | G01V 1/16 367/13 |
| 5,235,554 | A * | 8/1993 | Barr | G01V 1/364 367/13 |
| 5,247,486 | A | 9/1993 | Regnault | |
| 5,719,821 | A * | 2/1998 | Sallas | G01V 1/375 367/38 |
| 5,721,710 | A * | 2/1998 | Sallas | G01V 1/375 367/38 |
| 5,724,306 | A * | 3/1998 | Barr | G01V 1/3808 181/110 |
| 6,018,494 | A * | 1/2000 | Laws | G01V 1/006 181/110 |
| 6,035,257 | A | 3/2000 | Epperson | |
| 6,188,963 | B1 * | 2/2001 | Paffenholz | G01V 1/364 367/24 |
| 6,381,544 | B1 * | 4/2002 | Sallas | G01V 1/36 702/17 |
| 6,418,079 | B1 | 7/2002 | Fleure | |
| 6,536,553 | B1 * | 3/2003 | Scanlon | G01N 29/069 181/108 |
| 6,851,511 | B2 | 2/2005 | Tenghamn | |
| 6,883,638 | B1 * | 4/2005 | Maxwell | G01D 11/245 181/102 |
| 7,058,184 | B1 * | 6/2006 | Hickling | G01H 3/00 381/92 |
| 7,974,152 | B2 * | 7/2011 | Tenghamn | G10K 9/121 181/110 |
| 9,562,982 | B1 * | 2/2017 | McConnell | G01V 1/159 |
| 9,568,640 | B2 * | 2/2017 | Csutak | G01V 1/162 |
| 9,625,598 | B2 * | 4/2017 | McConnell | G01V 1/3861 |
| 9,791,581 | B2 * | 10/2017 | Siliqi | G01V 1/362 |
| 2004/0125696 | A1 * | 7/2004 | Jones | G01V 1/008 367/14 |
| 2005/0114034 | A1 * | 5/2005 | Bagaini | G01V 1/16 702/14 |
| 2005/0259513 | A1 | 11/2005 | Parkes | |
| 2006/0018192 | A1 | 1/2006 | Jeffryes et al. | |
| 2007/0297287 | A1 * | 12/2007 | Robertsson | G01V 1/201 367/24 |
| 2008/0275649 | A1 * | 11/2008 | Ozdemir | G01V 1/28 702/14 |
| 2009/0010103 | A1 * | 1/2009 | Sallas | G01V 1/005 367/41 |
| 2009/0168601 | A1 * | 7/2009 | Ferber | G01V 1/364 367/43 |
| 2010/0142320 | A1 * | 6/2010 | Bagaini | G01V 1/37 367/49 |
| 2010/0322028 | A1 * | 12/2010 | Tenghamn | G01V 1/159 367/21 |
| 2011/0013482 | A1 * | 1/2011 | Eick | G01V 1/003 367/38 |
| 2011/0069581 | A1 * | 3/2011 | Krohn | G01V 1/364 367/43 |
| 2011/0075514 | A1 * | 3/2011 | Barajas-Olalde | G01V 1/364 367/43 |
| 2011/0149683 | A1 | 6/2011 | Lunde et al. | |
| 2011/0222371 | A1 * | 9/2011 | Liu | G01V 13/00 367/76 |
| 2011/0242933 | A1 * | 10/2011 | Maissant | G01V 13/00 367/13 |
| 2011/0317515 | A1 | 12/2011 | Tenghamn et al. | |
| 2012/0037445 | A1 * | 2/2012 | Eick | G01V 1/006 181/121 |
| 2012/0087207 | A1 | 4/2012 | Kostov et al. | |
| 2012/0271551 | A1 * | 10/2012 | Wei | G01V 1/0475 702/17 |
| 2013/0051180 | A1 | 2/2013 | Chelminski | |
| 2013/0100778 | A1 | 4/2013 | Ruet et al. | |
| 2013/0116926 | A1 * | 5/2013 | Rodney | G01V 1/42 702/8 |
| 2013/0163381 | A1 * | 6/2013 | Sallas | G01V 1/005 367/41 |
| 2013/0201793 | A1 * | 8/2013 | Rowse | G01V 1/0475 367/38 |
| 2014/0056108 | A1 | 2/2014 | Chelminski | |
| 2014/0112098 | A1 * | 4/2014 | Sallas | G01V 1/36 367/44 |
| 2014/0305732 | A1 | 10/2014 | Tulett et al. | |
| 2015/0293244 | A1 * | 10/2015 | Tabti | G01V 1/006 702/14 |
| 2015/0308864 | A1 * | 10/2015 | Paulsson | G01V 1/48 73/152.16 |
| 2016/0187513 | A1 * | 6/2016 | Poole | G01V 1/362 702/16 |
| 2016/0259072 | A1 * | 9/2016 | Richer De Forges | G01V 1/006 |
| 2016/0327662 | A1 * | 11/2016 | Bernhardsson | G01V 1/143 |
| 2016/0327663 | A1 | 11/2016 | Bernhardsson et al. | |
| 2017/0068004 | A1 * | 3/2017 | Takanashi | G01V 1/001 |
| 2017/0276812 | A1 * | 9/2017 | Morozov | G01V 1/137 |
| 2017/0299750 | A1 * | 10/2017 | Tenghamn | G01V 1/3808 |
| 2018/0128927 | A1 * | 5/2018 | Tenghamn | G01V 1/005 |
| 2018/0372907 | A1 * | 12/2018 | Dykstra | G01V 3/26 |

OTHER PUBLICATIONS

International Search Report and Written Opinion in Application No. PCT/EP2014/079486 dated Apr. 13, 2015, 12 pages.
International Search Report and Written Opinion in Application No. PCT/EP2014/079485 dated Apr. 29, 2015, 17 pages.
International Search Report and Written Opinion in Application No. PCT/EP2014/079484 dated Apr. 13, 2015, 11 pages.
TechLink Article, PGS Electrical Marine Vibrator, a Publication of PGS Geophysical, vol. 5 No. 11, Nov. 2005, 4 pages.
Bill Pramik, "New marine vibrator offers improved performance," OE Digital, Oct. 1, 2013, 4 pages.
Office Action in EP Appl. No. 14824857.8 dated Mar. 27, 2018, 8 pages.
Ziolkowski, A., et al., The signature of an air gun array: Computation from near-field measurements including interactions,: Geophysics, vol. 47, No. 10, Oct. 1982, pp. 1413-1421.
First Examination Report in Australian Appl. No. 2014375216 dated Aug. 15, 2019, 3 pages.
Examination Report in European Appl. No. 14830399.3 dated Oct. 31, 2019, 6 pages.

* cited by examiner

CONTROL SYSTEM FOR MARINE VIBRATORS OPERATING NEAR IMPULSIVE SEISMIC SIGNAL SOURCES

CROSS-REFERENCE TO RELATED APPLICATIONS

This application claims priority to U.S. Prov. App. No. 61/921,962, filed on Dec. 30, 2013, which is incorporated by reference herein in its entirety. This application is also related to U.S. Pat. No. 7,974,152, which is incorporated by reference herein in its entirety.

BACKGROUND

This disclosure relates generally to the field of seismic surveying, e.g., marine geophysical surveying, and more specifically to systems and methods for improved performance of marine vibrators, and/or to enable seismic operations in areas where use of conventional air guns and vibrators with high-frequency noise may not be environmentally acceptable.

Seismic sources, including vibrators, are used in geophysical exploration on land and in water-covered areas of the earth. Signals generated by these sources travel downwardly into the subsurface and are reflected from reflecting interfaces in the subsurface. The reflected energy is detected by signal detectors, typically hydrophones or geophones, on or near the earth's surface or near the water surface in water-covered exploration areas.

Most of the acoustic sources presently used in marine seismic acquisition operations are of the impulsive type, in which as much energy as possible is generated during as short a time span as possible. Examples of such impulse sources include air guns and water guns. The frequency content of such sources is typically controllable only to a small degree, and different individual sources are selected and operated together in an array for the generation of different frequency ranges of seismic energy for different seismic surveying needs.

Vibratory acoustic sources, including hydraulically powered sources and sources employing piezoelectric or magnetostrictive material, have been used in marine operations. However, such sources have found only limited use. Although such sources can generate signals over various frequency bands, commonly referred to as "frequency sweeps," the limited power that such sources known in the art have been able to generate has limited their use in marine operations.

It is well known that as sound waves travel through water and through subsurface geological structures, higher frequency sound waves are typically attenuated more rapidly than lower frequency sound waves, and consequently, lower frequency sound waves can be transmitted over longer distances through water and geological structures than higher frequency sound waves. There has for a long time been a need in the seismic sector of the oil and gas industry for powerful low frequency vibrator type marine seismic energy sources.

It is also important that the spectral content of the seismic energy generated by a vibrator be well known or characterized in order to be able to properly interpret the reflected seismic energy from the subsurface. Control methods used for operating high-powered land-based vibrators are not necessarily adaptable to use in controlling marine vibrators.

There also exists a need for a control method for a marine vibrator to assure well characterized energy spectral content.

Figure 1:
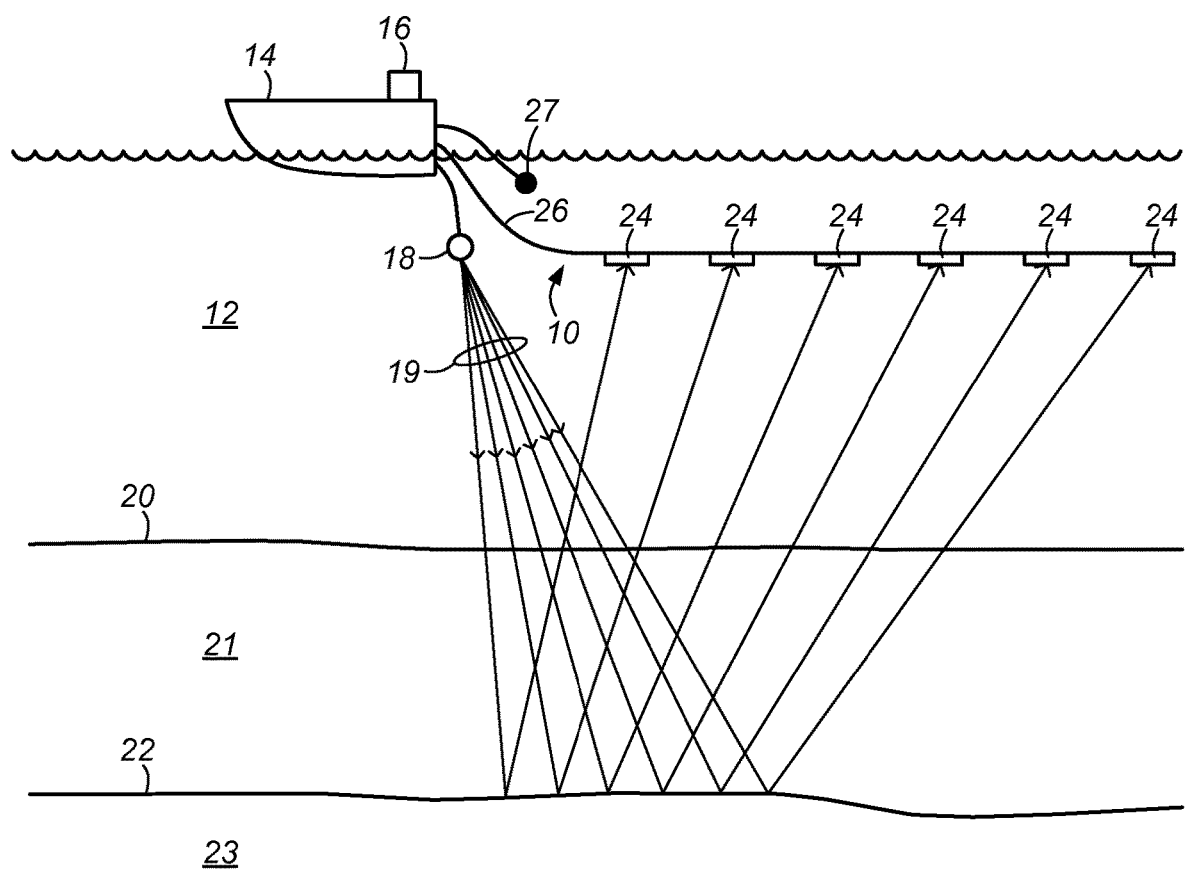
FIG. 1 is a diagram illustrating one embodiment of a geophysical survey system.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various devices, units, circuits, or other components may be described or claimed as "configured to," "usable to," or "operable to" perform a task or tasks. In such contexts, "configured to," "usable to," and "operable to" are each used to connote structure by indicating that the devices/units/circuits/components include structure that performs the task or tasks during operation. As such, the device/unit/circuit/component can be said to be configured to, usable to, or usable to perform the task even when the specified device/unit/circuit/component is not currently operational (e.g., is not on or in operation). The devices/units/circuits/components used with the "configured to," "usable to," or "operable to" language may include electronic hardware for example, circuits, memory storing program instructions executable to implement the operation, etc. mechanical devices, or other types of structure. Reciting that a device/unit/circuit/component is "configured to," "usable to," or "operable to" perform one or more tasks is expressly intended not to invoke 35 U.S.C. § 112(f), for that device/unit/circuit/component.

In some embodiments, various items of information relating to seismic surveying may be embodied in a geophysical data product. A "geophysical data product" may be stored on a computer-readable, non-transitory medium and may embody geophysical data (such as raw streamer data, processed streamer data, two- or three-dimensional maps based on streamer data, etc.). Some non-limiting examples of computer-readable media may include hard drives, CDs, DVDs, print-outs, etc. In some embodiments, raw analog data from streamers may be stored as a geophysical data product. In other instances, the data may first be digitized and/or conditioned prior to being stored as the geophysical data product. In yet other instances, the data may be fully processed into a two- or three-dimensional map of the various geophysical structures before being stored in the geophysical data product. The geophysical data product may be produced offshore (e.g., by equipment on a vessel) or onshore (e.g., at a facility on land) either within the United States or in another country. If the geophysical data product is produced offshore or in another country, it may be imported onshore to a facility in the United States. Once onshore in the United States, geophysical analysis may be performed on the geophysical data product.

DETAILED DESCRIPTION

Terms

Marine Vibrator—A marine vibrator may be generally described as an electromechanical transducer usable to generate acoustic energy, e.g., seismic energy, into water. Some embodiments of marine vibrators may contain one or more of (among other things) a vibrator shell, actuators, a mechanical system connecting the actuators with the vibrator shell, and one or more local sensors associated with the vibrator. Some embodiments may utilize a piston plate to transmit vibrations into the water.

Actuator—An actuator may be generally described as a device usable to convert an electric input signal into a mechanical force and/or displacement, change in velocity, etc. The actuators may in some embodiments be implemented as voice-coils, piezoelectrics, magnetostrictive, impulsive (e.g., explosives, etc.), and/or hydraulic, among others. For example, in some embodiments, a so-called "flexural-disc projector" or a "bender" may be used as a vibratory source, where a bender may include a disc of elastic material, e.g., aluminum, and a piezoelectric ceramic (e.g., PZT) attached thereto.

Acoustic sensor—An acoustic sensor may be generally described as a sensor operable to measure pressure, particle velocity, acceleration, and/or displacement. For example, shell displacement may be measured with low-cost capacitive methods, and/or strain/stress which may be correlated with the far field pressure generated by the vibrator.

Local sensor at the vibrator or simply local sensor—These terms generally refer to acoustic sensors mounted inside, on, or near, i.e., proximate to, the vibrator. For example, a local sensor may be located at a distance that is small relative to the size of the vibrator.

Remote acoustic sensor—A remote acoustic sensor may be generally described as a sensor operable to measure the acoustic signal emitted from the vibrator at a distance that is large compared with the size of the transducer (or marine vibrator), also known as a far-field signal. A remote acoustic sensor may in some embodiments be placed in the acoustic far-field of the vibrator.

Note that the terms "remote" and "local" may have specific meanings (or thresholds) for different applications. For example, in some embodiments, local may refer to positions on, in, or within one diameter of the transducer (or marine vibrator). However, in some other embodiments, local may refer to positions on, in, or within several (e.g., 3, 4, or 5) diameters of the transducer (or marine vibrator). Conversely, remote may refer to positions that are not local, e.g., positions outside this range, e.g., more than one diameter of the transducer, or in some other embodiments, more than 3, 4, or 5 diameters, and so forth, as desired. Note that in various other embodiments, the threshold between local remote and remote positions may have other values, e.g., 2, 6, 10 diameters, and so forth, as desired. In other words, a particular application may establish a threshold value for the local/remote demarcation as appropriate. For purposes of this disclosure, it should be understood that the term "on" is defined such that a sensor that is "on" an apparatus may in some embodiments be inside that apparatus.

Iterative Learning Control ("ILC") algorithm—An ILC algorithm may be generally described as a learning control algorithm usable to control repeated transmissions of acoustic signals by making adjustments following each iteration or series of iterations. Signals are measured during transmission and compared with reference signals. The error observed may be used to calculate correction signals to be used for the next transmission. The correction may be based on a model of the transducer.

Audio band—Audio band may be generally described as the seismic frequency band for which a marine vibrator is designed to transmit most of its energy. The upper limit of the audio band may depend on the seismic application and may be below 300 Hz in some embodiments.

Control band—The control band may be generally described as the frequency range over which the ILC algorithm is operating. The control band may typically be an order of magnitude wider than the audio band.

Seismic signal—A seismic signal may be generally described as a signal with a certain duration transmitted by a marine vibrator at repeated occasions. The signal may be a pulse or part of a continuous signal. One or more seismic signals may be used during transmission.

Iteration—An iteration refers to a single pass through a repetitive process. In some embodiments, a typical iteration may include the processes of transmission of an acoustic, e.g., seismic, signal; recording of the transmitted signal; computation of a correction signal to be used for the next iteration; and updating a model.

DESCRIPTION

According to the following description, embodiments of the present disclosure are presented.

FIG. 1 is a simple diagram illustrating one embodiment of an example marine seismic data acquisition system as it is typically used for acquiring seismic data, i.e., for a marine seismic survey. In the example embodiment shown, seismic vessel 14 moves along the surface of body of water 12 such as a lake or the ocean. The marine seismic survey is intended to detect and record seismic signals related to structure and composition of various subsurface formations 21 and 23 below the water bottom 20. Seismic vessel 14 includes source actuation, data recording and navigation equipment, shown generally at 16, referred to for convenience as a "recording system." Seismic vessel 14, or a different vessel (not shown), can tow one or more seismic energy sources 18, or arrays of such sources in water 12. The seismic energy source(s) in the present example may be marine vibrators of a structure and having a control system as will be further explained below. Seismic vessel 14 or a different vessel tows at least one seismic streamer 10 near the surface of water 12. Streamer 10 is coupled to seismic vessel 14 by lead-in cable 26. A plurality of sensor arrays 24 are disposed at spaced apart locations along streamer 10. Sensor arrays 24 may be formed by mounting a seismic sensor inside each one of a plurality of sensor spacers and disposing the sensor spacers along the streamer in a particular arrangement. Remote sensor 27 may also be used, as described below, in addition to or in lieu of sensor arrays 24, for calibration of seismic energy sources 18.

During operation, certain equipment (not shown separately) in recording system 16 causes seismic energy sources 18 to actuate at selected times. When actuated, seismic energy sources 18 produce seismic energy 19 that emanates generally outwardly from seismic energy sources 18. Seismic energy 19 travels downwardly, through water 12, and passes, at least in part, through water bottom 20 into formations 21 and 23 below. Seismic energy 19 is at least partially reflected from one or more acoustic impedance boundaries 22 below water bottom 20 and travels upwardly, whereupon it may be detected by the sensors in each sensor array 24. The structure of formations 21 and 23, among other properties of the Earth's subsurface, can be inferred by the travel time of seismic energy 19 and by characteristics of the detected energy such as its amplitude and phase.

Figure 2:
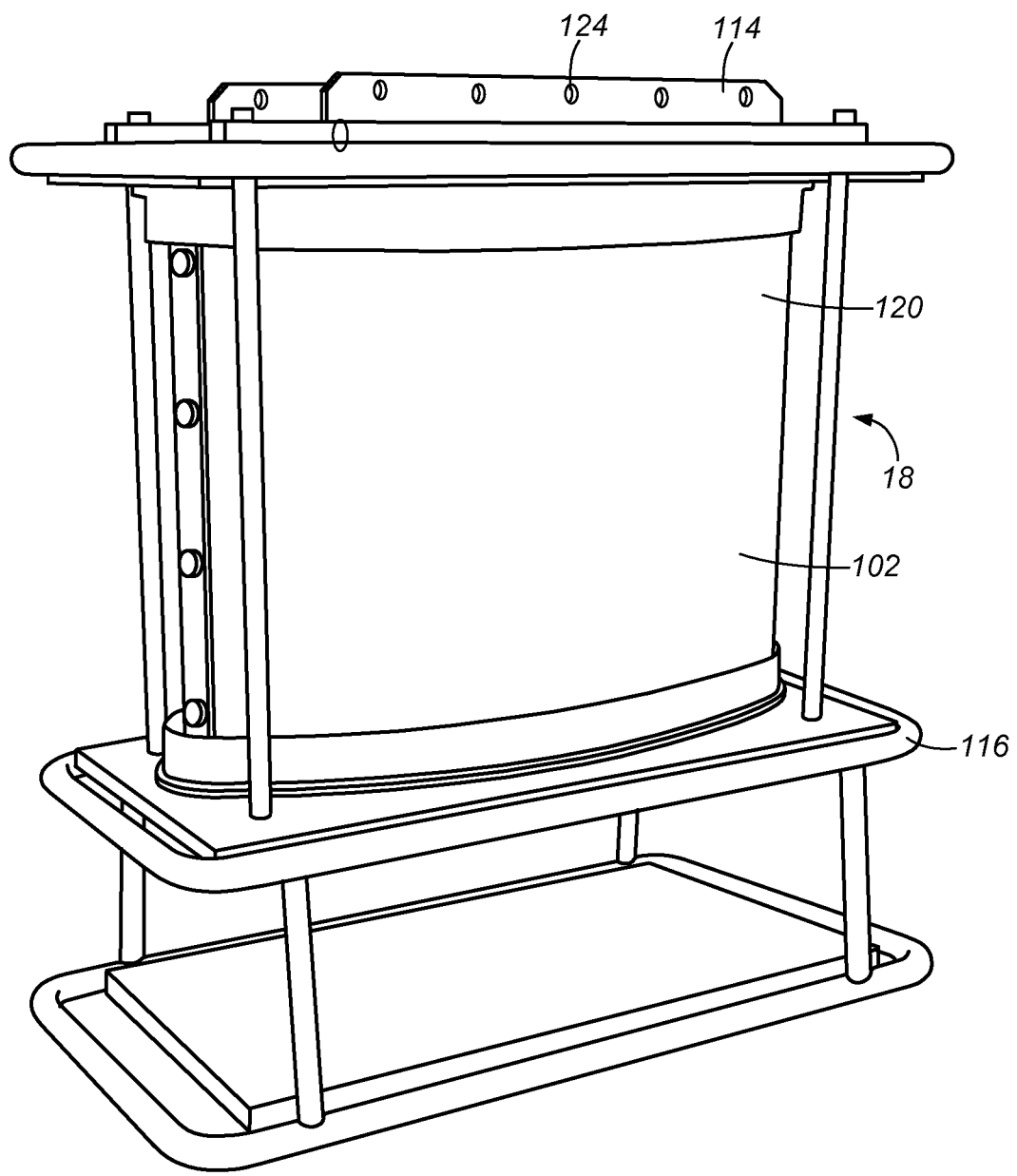
FIG. 2 illustrates an isometric view of an example of a marine vibrator according to one embodiment.

FIG. 2 shows an example implementation of seismic energy source 18, which includes vibrator source 120 mounted within frame 116. Bracket 114 is connected to the top of frame 116 and includes apertures 124 which may be used for deploying seismic energy source 18 into the body of water (e.g., as shown in FIG. 1). Shell 102 may be used for transmitting the vibrations of seismic energy source 18 into the surrounding water.

Analysis of Marine Vibrator Operation

The total impedance that will be experienced by a marine vibrator in some embodiments may be expressed as follows:

$$Z_r = R_r + iX_r \quad (Eq. 1)$$

where $Z_r$ is total impedance, $R_r$ is radiation impedance, and $X_r$ is reactive impedance.

In an analysis of the energy transfer of a marine vibrator, the system may be approximated as a baffled piston. In the expression of the total impedance that will be experienced, the radiation impedance $R_r$ of a baffled piston is:

$$R_r = \pi a^2 \rho_0 c R_1(x), \quad (Eq. 2)$$

and the reactive impedance is:

$$X_r = \pi a^2 \rho_0 c X_1(x), \quad (Eq. 3)$$

where $$x = 2ka = \frac{4\pi a}{\lambda} = \frac{2\omega a}{c}, \quad (Eq. 4)$$

and where $$R_1(x) = 1 - \frac{2}{x} J_1(x), \quad (Eq. 5)$$

and $$X_1(x) = \frac{4}{\pi} \int_0^{\frac{\pi}{2}} \sin(x\cos\alpha)\sin^2\alpha \, d\alpha, \quad (Eq. 6)$$

where $\rho_0$=density of water, $\omega$=radial frequency, k=wave number, a=radius of piston, c=sound velocity, $\lambda$=wave length, and $J_1$=Bessel function of the first order.

Using the Taylor series expansion on the above equations yields:

$$R_1(x) = \frac{x^2}{2^2 1! 2!} - \frac{x^4}{2^4 2! 3!} + \ldots, \quad (Eq. 7)$$

and $$X_1(x) = \frac{4}{\pi}\left[\frac{x}{3} - \frac{x^3}{3^2 \cdot 5} + \frac{x^5}{3^2 \cdot 5^2 \cdot 7} - \ldots\right]. \quad (Eq. 8)$$

Note that for low frequencies, when x=2ka is much smaller than 1, the real and imaginary part of the total impedance expression may be approximated with the first term of the Taylor expansion. The expressions for low frequencies when the wave length is much larger than the radius of the piston becomes:

$$R_1(x) \to \frac{1}{2}(ka)^2 \quad (Eq. 9)$$

$$X_1(x) \to \frac{8ka}{3\pi}. \quad (Eq. 10)$$

It follows that for low frequencies R will typically be a small number compared to X, which suggests a very low-efficiency signal generation. However, by introducing a resonance in the lower end of the frequency spectrum, low-frequency acoustic energy may be generated more efficiently. At resonance, the imaginary (reactive) part of the impedance is canceled, and the acoustic source is able to efficiently transmit acoustic energy into the water.

Use of Multiple Actuators in a Marine Vibrator

In one embodiment, a marine vibrator may be configured to generate or otherwise use at least two resonant frequencies within the seismic frequency range of interest, typically a range between 1 Hz and 200 Hz.

Figure 3:
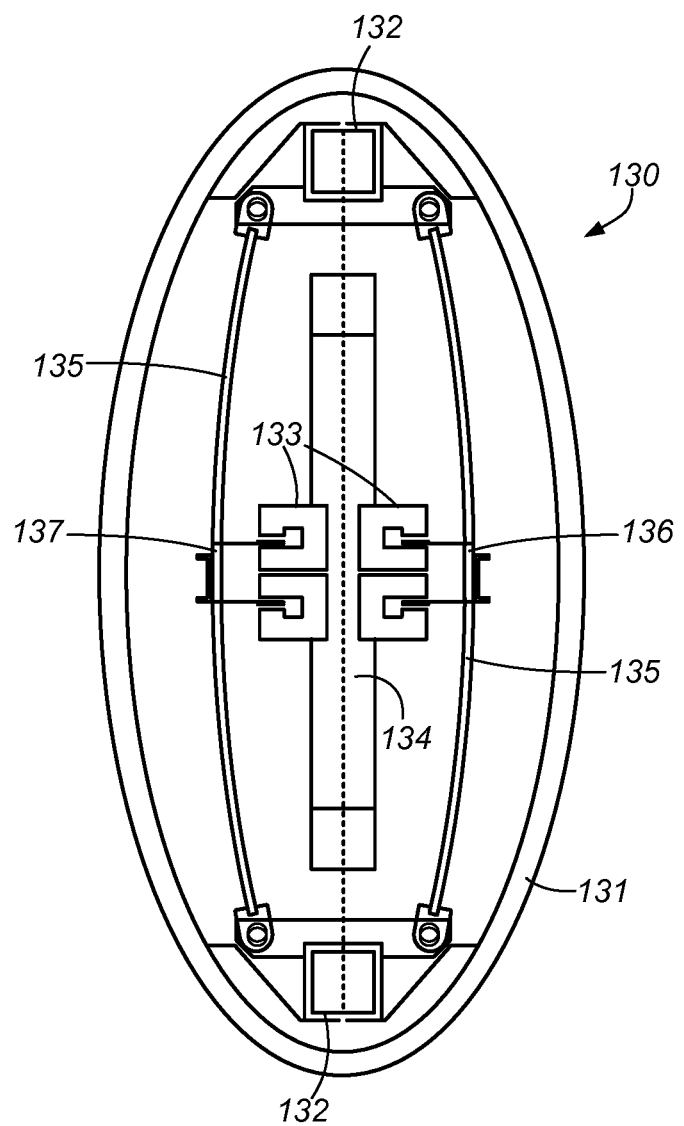
FIG. 3 illustrates the marine vibrator of FIG. 2 in partial cross-section according to one embodiment.

FIG. 3 shows an embodiment of marine vibrator 130 in partial cross-section, which includes main frame 134, end beams with sliding bearings 132, and drivers 133, which may be electrodynamic drivers. As shown, drivers 133 and coils 136 and 137 may be used to actuate marine vibrator 130. Although the particular embodiment described herein shows only a dual driver, an embodiment in which more than two drivers are utilized in parallel (or fewer than two drivers) is within the scope of this disclosure. The embodiment further includes a flextensional shell 131. In a particular implementation, the flextensional shell also acts as a spring for the first resonance. In one embodiment in which driver 133 comprises an electrodynamic driver, the driver further comprises magnetic circuitry that will generate a magnetic field for the electrical coil. When electrical current is applied to the coil, a force will be generated where F=IlB, where I is the current, l is the length of the conductor in the coil and B is the magnetic flux in the air gap in the magnetic circuit. By varying the magnitude of the electrical current, and consequently the magnitude of the force acting on the coil, the length of the driver stroke will vary. Typically, permanent magnets are utilized in the magnetic circuit to generate the magnetic flux. By using this type of driver it is possible to get long strokes of several inches, which may be useful to be able to generate significant acoustic output in the frequency range 1-10 Hz.

In FIG. 3 an inner spring 135 is shown with masses attached thereto. As further discussed below, inner spring 135, with masses attached thereto, may be included to achieve a second system resonance frequency within the seismic frequency range of interest. Although a vibrator system that included only the flextensional shell acting as a spring would typically display a second resonance frequency, for systems having a size suitable for use in geophysical exploration, the second resonance frequency would be much higher than the frequencies within the seismic frequency range of interest.

Figure 4:
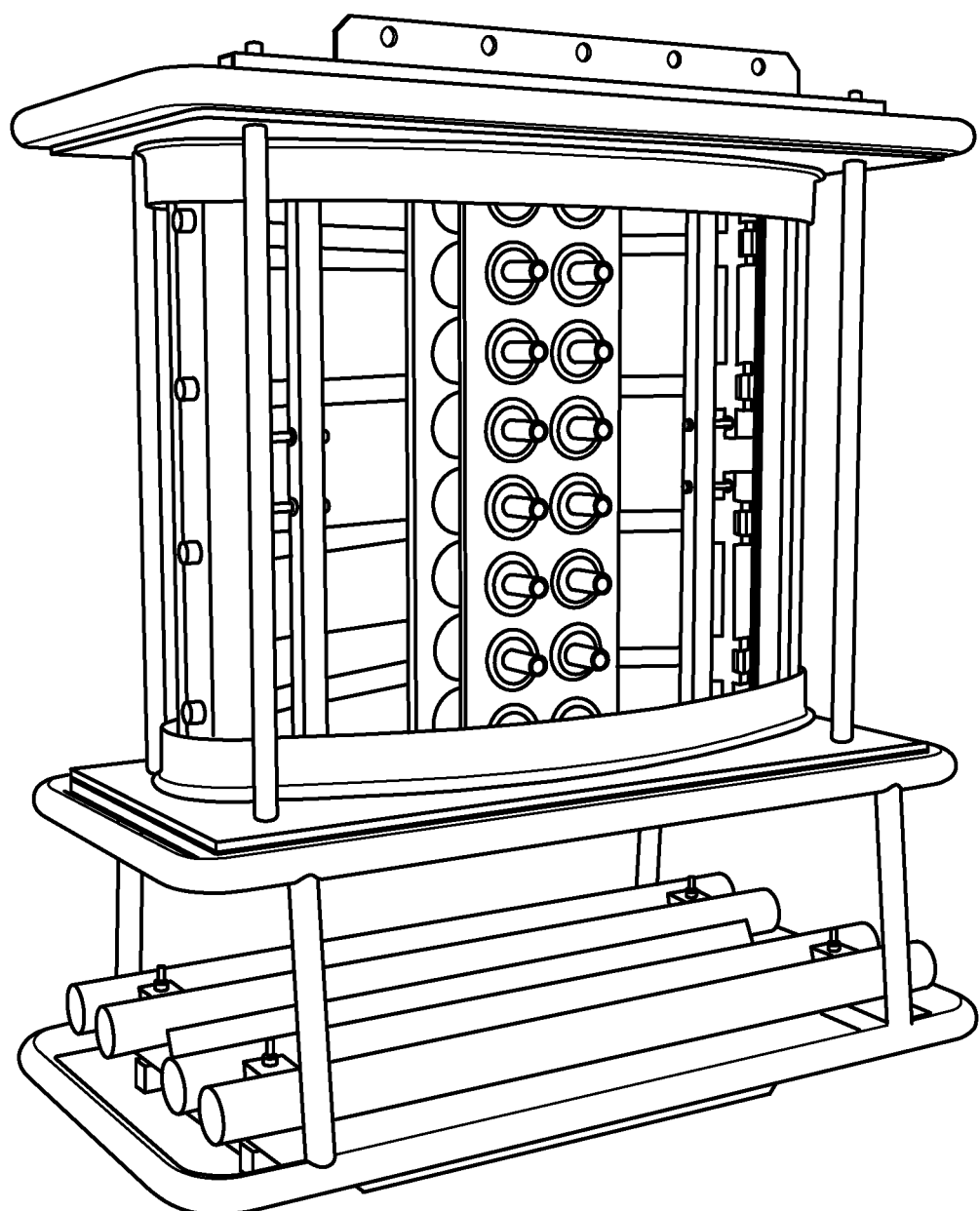
FIG. 4 illustrates an electrodynamic driver of the marine vibrator of FIG. 2 according to one embodiment.
Figure 5:
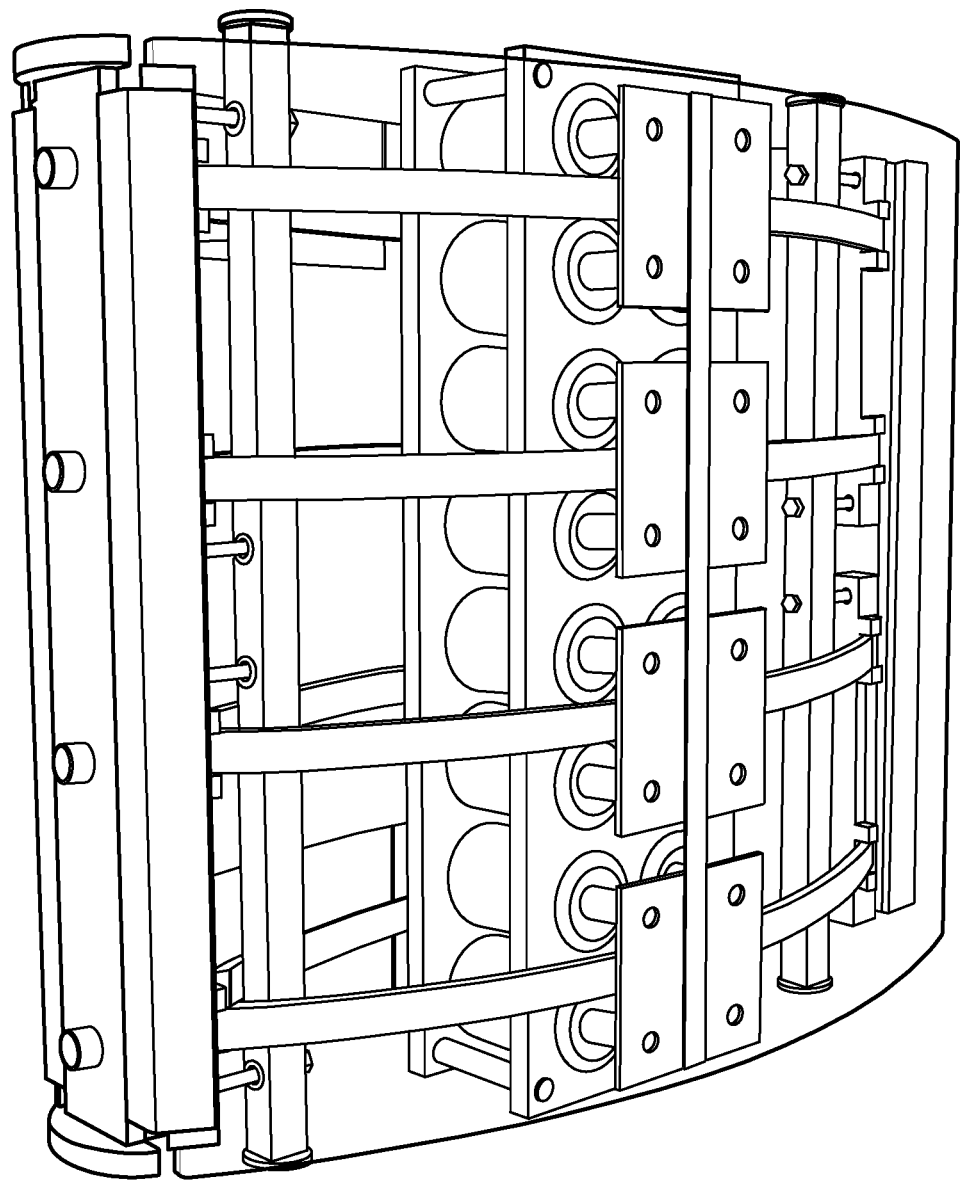
FIG. 5 illustrates the electrodynamic driver of FIG. 4 in combination with spring elements according to one embodiment.
Figure 6:
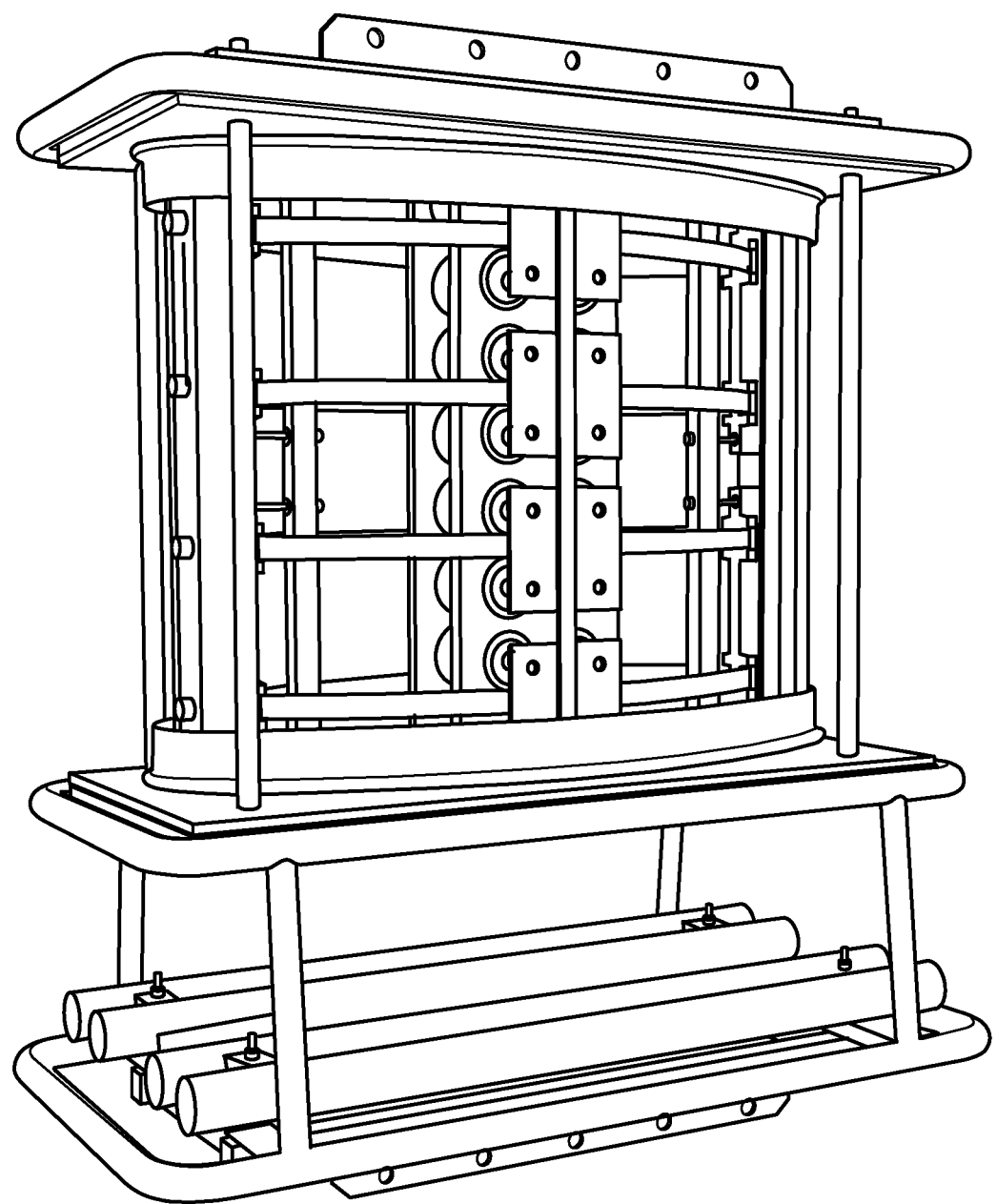
FIG. 6 illustrates the electrodynamic drivers of FIG. 4 in combination with the spring elements according to another embodiment.

FIGS. 4-6 show additional partial cutaway views of the embodiment shown in FIG. 3. In particular, FIG. 4 illustrates an electrodynamic driver within the marine vibrator. FIG. 5 illustrates the electrodynamic driver in combination with spring elements according to one embodiment. FIG. 6 illustrates the electrodynamic drivers in combination with the spring elements according to another embodiment. As one of ordinary skill with the benefit of this disclosure will appreciate, various imperfections in joints, bearings, shells, electronics, magnetic materials, etc. may cause non-linear effects in marine vibrators. Control systems and methods according to this disclosure may be used to mitigate such effects in some cases.

Figure 7:
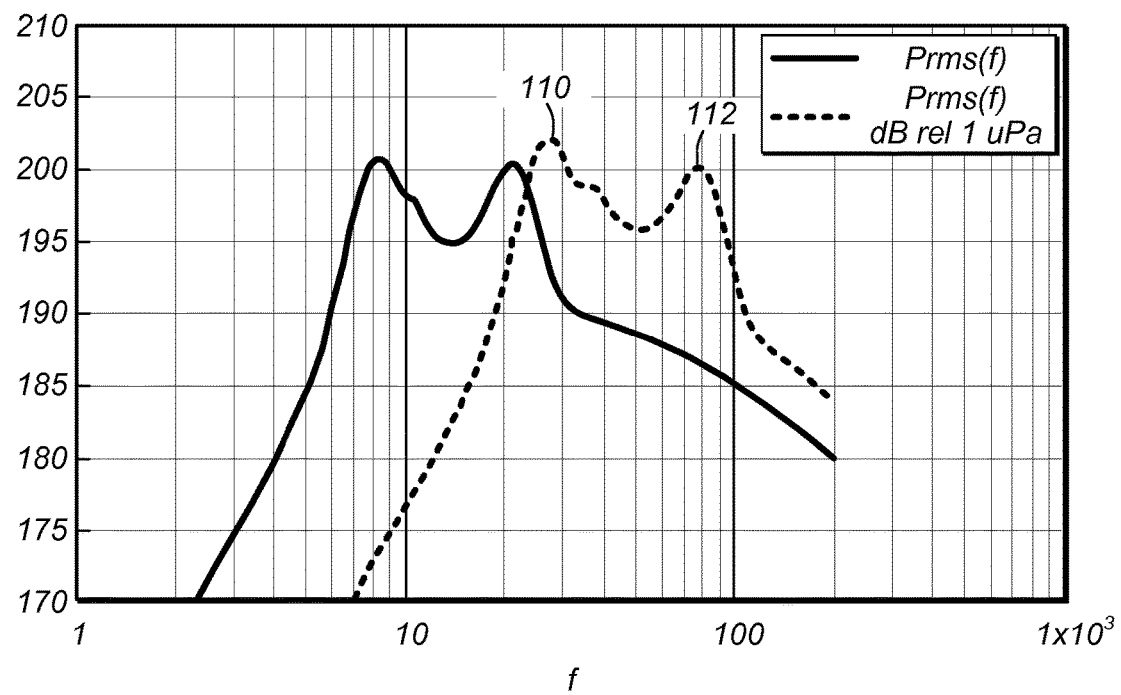
FIG. 7 illustrates an example of an amplitude spectrum with two resonances and two sources according to one embodiment.

FIG. 7 shows a graph of the frequency response of a marine vibrator according to an embodiment. As shown, FIG. 7 includes the frequency response in both RMS power and in pressure in dB relative to 1 µPa. The first resonance frequency 110 results substantially from interaction of the flextensional shell acting as a spring. The second resonance frequency 112 results substantially from the interaction of the inner spring with its added masses.

Figure 8:
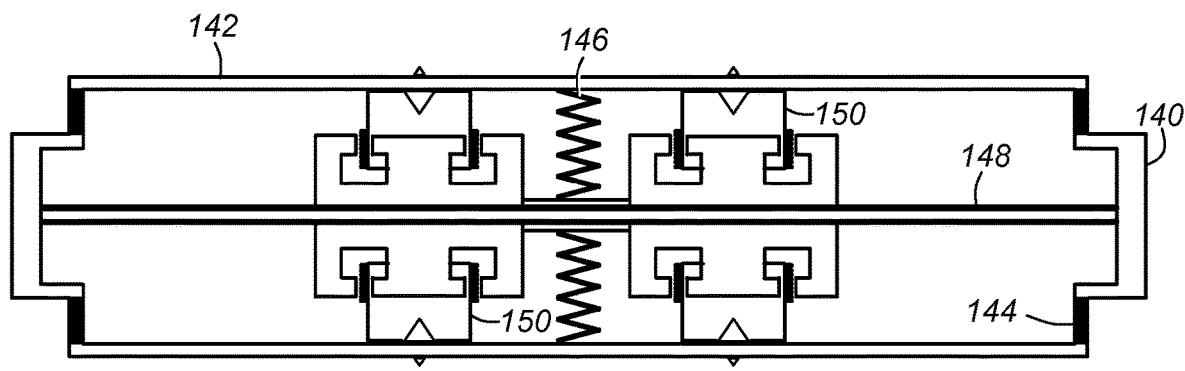
FIG. 8 illustrates a cross section of an example piston-type marine vibrator that includes two actuators for operating a control system according to one embodiment.
Figure 9:
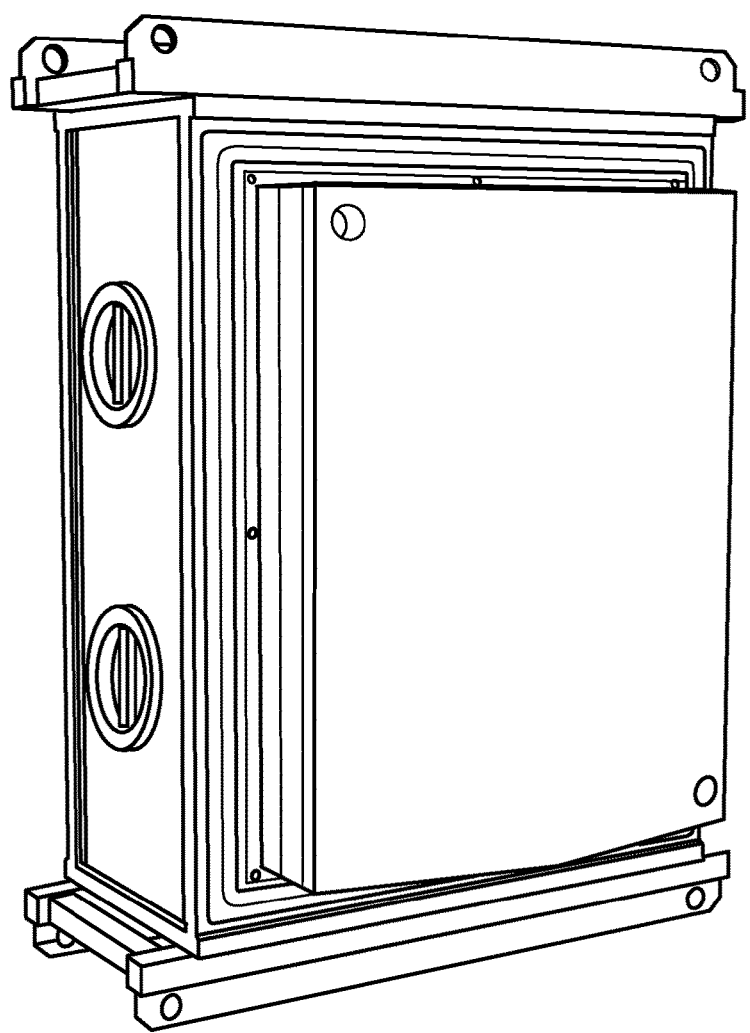
FIG. 9 illustrates an example embodiment of the piston type marine vibrator of FIG. 8.

FIGS. 8 and 9 illustrate a piston-type marine vibrator that may be used in accordance with this disclosure. In the illustrated embodiment, the marine vibrator includes a containment housing 140. Piston plates 142 may be flexibly coupled to the containment housing 140, for example, by way of rubber seals 144. Piston plates 142 may each have spring elements 146 attached to them. The spring elements 146 may be disposed between the piston plates 142 and a fixture 148. One or more drivers 150 (e.g., electromagnetic drivers) may be coupled to piston plates 142 and fixture 148 to cause piston plates 142 to move back and forth. This motion of piston plates 142 takes advantage of the flexibility of rubber seals 144. As would be understood by one of ordinary skill in the art with the benefit of this disclosure, rubber seals 144 do not need to be made of rubber, but rather could be made from any material that allows a flexible coupling of piston plates 142 to containment housing 140. FIG. 9 shows a perspective view of the embodiment of FIG. 8.

Figure 10:
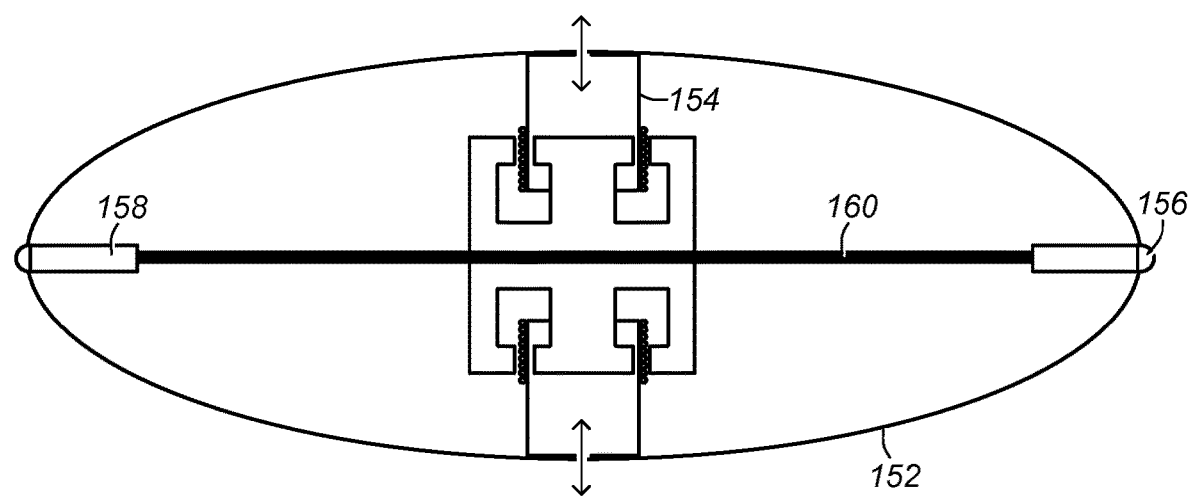
FIG. 10 illustrates a cross section of an example of a flextensional-type vibrator that has two actuators for operating a control system according to one embodiment.
Figure 11A:
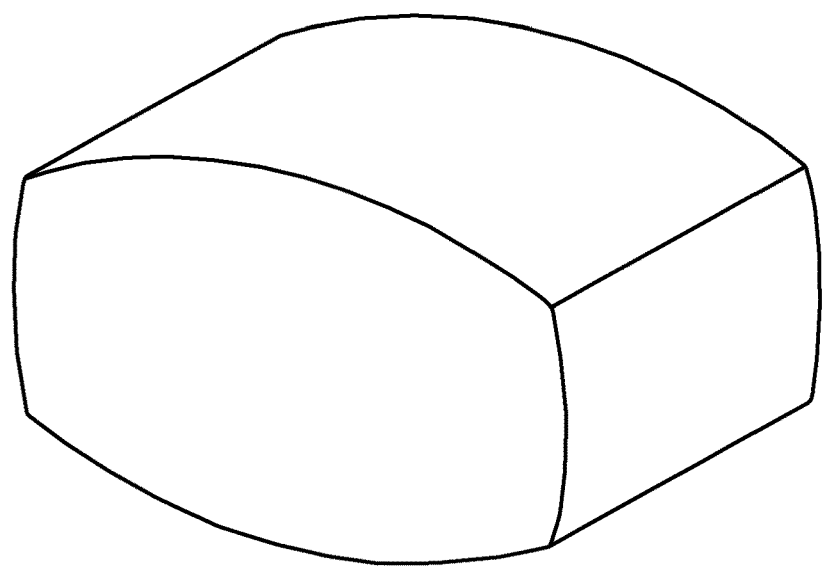
FIGS. 11A-11B illustrate the flextensional-type vibrator of FIG. 10 according to one embodiment.
Figure 11B:
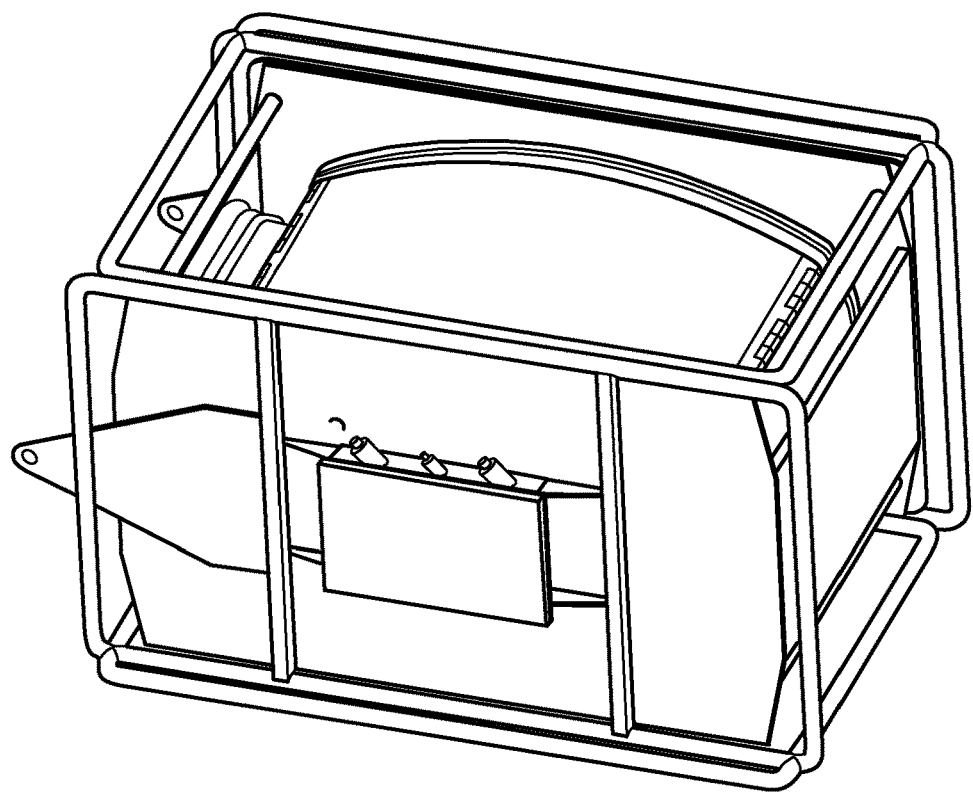

FIGS. 10 and 11A-11B illustrate a flextensional-type marine vibrator that may be used in accordance with this disclosure. As shown, flextensional shell 152 typically flexes during operation when driver 154 actuates. This may be accomplished via hinges 156 and linear bearings 158 that are attached to fixture 160. This type of marine vibrator may be compared to the piston-type vibrator of FIGS. 8 and 9, where piston plates 142 typically do not bend or flex in operation, but rather may move back and forth acting against the surrounding water. FIG. 11A shows a perspective view, and FIG. 11B shows a cutaway view of the embodiment of FIG. 10.

In constructing some specific implementations according to this disclosure, finite element analysis may be utilized as known to those of ordinary skill in the art. In any such analysis, the following principles of operation may be relevant. If a flextensional shell is approximated as a piston, then for low frequencies, the mass load, or the equivalent fluid mass acting on the shell is:

$$M_{shell} = \rho_0 \frac{8a^3}{3} \quad \text{(Eq. 11)}$$

where M is mass load, $\rho_0$ is density of water, and a is the equivalent radius for a piston which corresponds to the size of flextensional shell.

The flextensional shell has a spring constant $K_{shell}$ in the direction of the moving electrical coils. The first resonance, $f_{resonance}$ for the vibrator will be substantially determined by the following mass spring relationship $$f_{resonance} = \frac{1}{2\pi} \sqrt{\frac{K_{shell}}{M_{shell}}} \quad \text{(Eq. 12)}$$

To achieve efficient energy transmission with the seismic frequency range of interest, it is important to achieve a second resonance frequency within the seismic frequency range of interest. In the absence of the inner mass spring, the second resonance frequency would occur when the flextensional shell has its second Eigen-mode. This resonance frequency, however, is normally much higher than the first resonance frequency, and accordingly, may be outside the seismic frequency range of interest. As is evident from the foregoing equation, the resonant frequency will be reduced if the mass load on the flextensional shell is increased. This mass load could be increased by adding mass to the flextensional shell, however, in order to add sufficient mass to achieve a second resonance frequency within the seismic frequency range of interest, the amount of mass that would need to be added to the shell may make such a system impractical for use in marine seismic operations.

In accordance with the present disclosure, a second spring, the inner spring (e.g., inner spring 135 of FIG. 3), may be included inside the flextensional shell with added masses on the side of the inner spring. The extra spring, the inner spring, will have a transformation factor $T_{inner}$ between the long and short axes of its ellipse, so that the deflection of the two side portions will have a higher amplitude than the deflection of the end attached to the flextensional shell and driver coil.

The effect of such an added mass is equivalent to adding mass in the end of the driver where it is attached to the shell.

$$M_{inner}=(T_{inner})^2 \cdot M_{added} \quad \text{(Eq. 13)}$$

Use of the inner spring, with the added mass, may allow the second resonance of the system to be tuned so that the second resonance is within the seismic frequency range of interest, thereby improving the efficiency of the vibrator in the seismic band.

$$f_{resonance2} = \frac{1}{2\pi}\sqrt{\frac{K_{inner}+K_{shell}}{(T_{inner})^2 \cdot M_{added}+M_{shell}}} \quad \text{(Eq. 14)}$$

Where $K_{inner}$=spring constant of inner spring.

It is thus possible to tune the second resonance, but it is also possible to determine how big an influence this second resonance should have on the system. For example, if the inner spring is very weak compared to the flextensional shell, and a matching mass is added to the inner spring, the inner spring with its mass will function rather independently from the shell. The second resonance becomes $$f_{resonance2} = \frac{1}{2\pi}\sqrt{\frac{K_{inner}}{(T_{inner})^2 \cdot M_{added}}} \quad \text{(Eq. 15)}$$

In the same way, the second resonance may be made very dominant by selecting a stiff inner spring with a matching mass, thus making the second resonance more dominant than the first.

Having explained a suitable example of a marine seismic vibrator, a control system according to this disclosure will now be explained. "Control system" as used in the present disclosure is intended to mean a system which uses measurements from sensors coupled to the vibrator structure or are otherwise associated with the vibrator structure, the output of which are used to adjust a filter or convolution operator such that the true output of the vibrator has a spectral content as close as practical to the desired spectral content, and that harmonic frequencies in the vibrator output are suitably suppressed.

Figure 12:
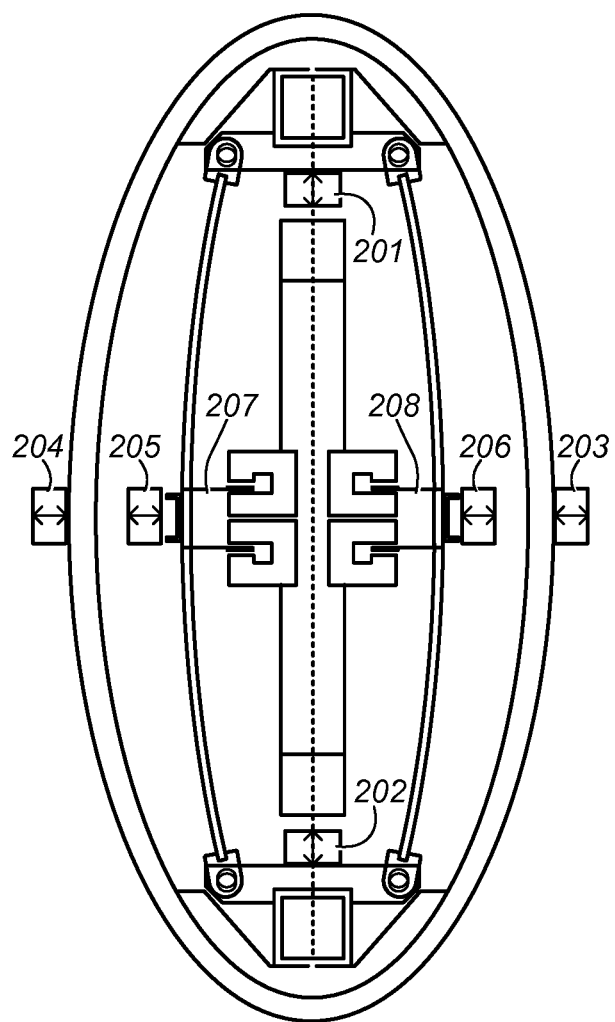
FIG. 12 illustrates a cross sectional view of an example of a marine vibrator with examples of sensor locations according to one embodiment.

Turning now to FIG. 12, a cross-sectional view is shown of the example vibrator that was described above with reference to FIGS. 4 through 6. Sensors 201 and 202 in FIG. 12 may be placed on or coupled to the end beams. Two other sensors 205 and 206 may be coupled to one end of drivers 207 and 208 in FIG. 12. In one example, another pair of sensors 203 and 204 may be placed in the middle of the shell on each side of the vibrator. In one embodiment, sensors 201, 202, 205 and 206 may be any type of particle motion sensor, for example geophones or accelerometers. In one embodiment, sensors 203 and 204 may be any type of particle motion sensor or a hydrophone disposed close to the wall of the shell. Sensors 203 and 204 are typically used for a control feedback loop (explained below) since they will have a close resemblance with the far field signal of the marine vibrator. In other examples, more or fewer than six sensors may be used to measure the response of the vibrator at other selected positions.

Figure 13:
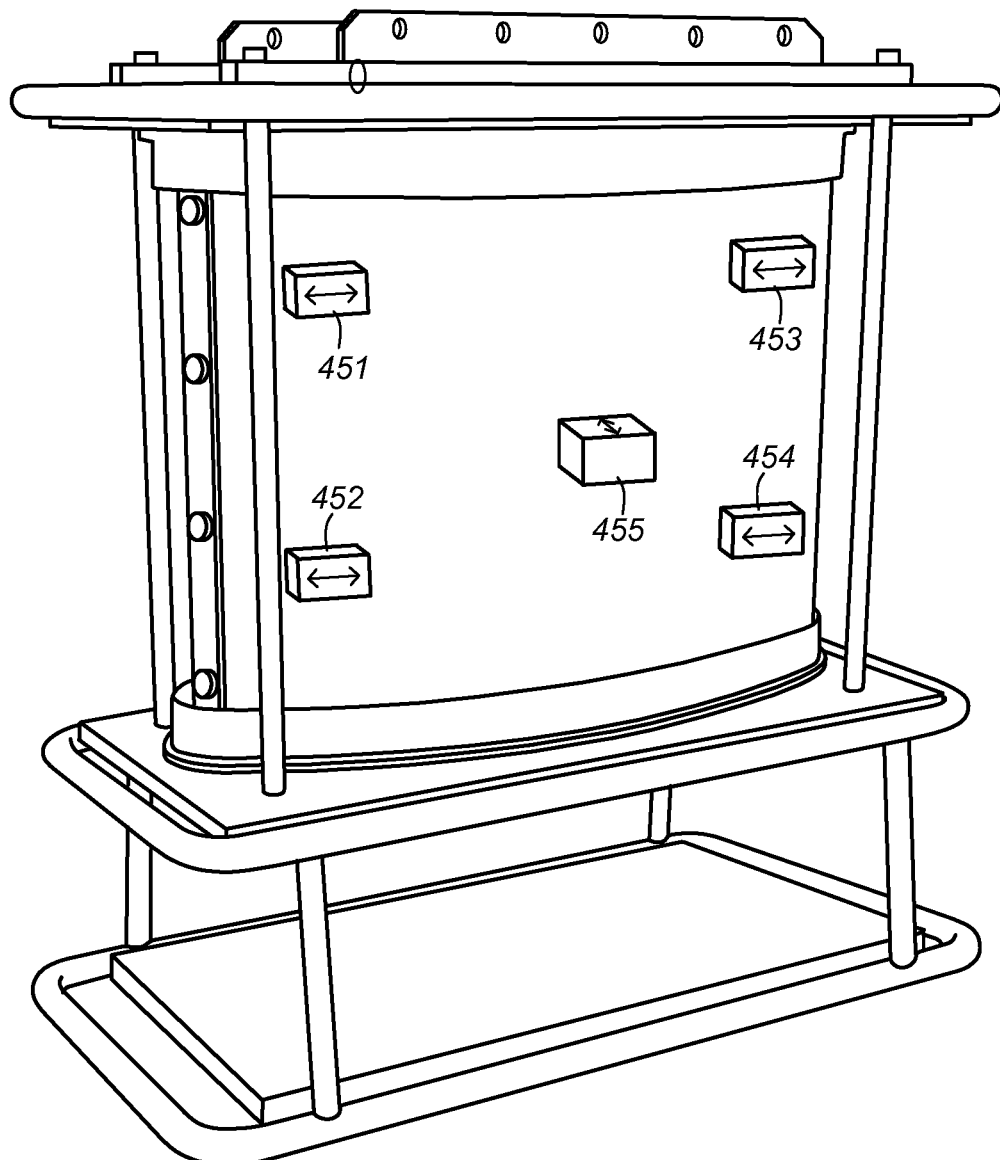
FIG. 13 illustrates an example marine vibrator that includes a flextensional shell with four sensors measuring movement in the plane of the shell according to one embodiment.

Sensors measuring motion perpendicular to the shell surface, shown in FIG. 12 as sensors 203 and 204, may measure the local deflection in an area close to sensor. In FIG. 13 a configuration is shown where one accelerometer 455 measures shell movement perpendicular to the shell, and four accelerometers 451-454 measure the shell movement in the plane of the shell. The average deflection of the shell is coupled to the shell movement in the plane of the shell, near the end beams. One possible advantage of this configuration is that the output of the sensors provides information more closely coupled to the instantaneous volume displacement of the transducer, compared with a sensor measuring local deflection at one point on the shell. End beam sensors 201 and 202 in FIG. 12 may be used for the same purpose, but the arrangement of FIG. 13 may be advantageous by measuring a signal closer to the water and avoiding issues of play in the end beams.

Additionally, at least one remote sensor (e.g., remote sensor 27 in FIG. 1) may be used to measure the far-field output from the transducer. In one embodiment sensor arrays 24 in FIG. 1 may also be used for this purpose. The main purpose of the control system is to generate a predefined acoustic signal in the far-field. Therefore, the transfer function from the transducer location to the approximate far-field location (sensor array 24 or remote sensor 27 in FIG. 1) is measured. The inverse of this transfer function is computed, and the acoustic output at the vibrator location is adjusted no that the signal in the far-field location matches the desired output signal as closely as possible.

Under normal operation of the vibrator is may be difficult to measure signals in the far-field, since amplitudes may typically be low, and ambient noise may have a negative effect on the measurements and ILC. Accordingly, in some embodiments, it may be advantageous to use one or more local sensors for ILC control during normal operation to attempt to produce a desired output waveform in the far-field (e.g., a waveform as close as possible to a desired theoretical or reference signal). Based on knowledge of how the signal is affected as it travels from the vibrator to far-field, a desired near-field signal may be determined that corresponds to the desired far-field signal. This may allow the ILC to proceed without actually measuring the signal in the far-field repeatedly (e.g., it may be measured once or a few times initially).

Accordingly, it may be advantageous to determine the signal transfer function from near-field to far-field and vice versa. This can be done using, for example, a chirp or stepped sine wave, and measuring signals in both the near-field and the far-field at the same time. This step typically need not involve ILC. The aim of this step is to be able to calculate a desired reference signal for the acoustic output locally, in order to get the desired signal in the far-field. This may avoid further far-field measurements during the actual ILC process. The transfer function and inverse transfer function that have been determined may then be used in combination with ILC, using only sensor information from local sensors. According to one embodiment, the aim of the ILC is to control the output so that it matches a modified reference signal that takes into account the signal propagation into the far field, such that the desired output is obtained in the far-field.

The output of the sensors shown in FIG. 12 and FIG. 13 may be used as input to an iterative learning control (ILC) system to change the signal used to drive the vibrator (e.g., seismic energy source 18 in FIG. 1) so that: (i) the vibrator will have an energy output having desired spectral characteristics; (ii) the output spectral characteristics are repeatable; and (iii) harmonics in the vibrator output are substantially suppressed.

Figure 14:
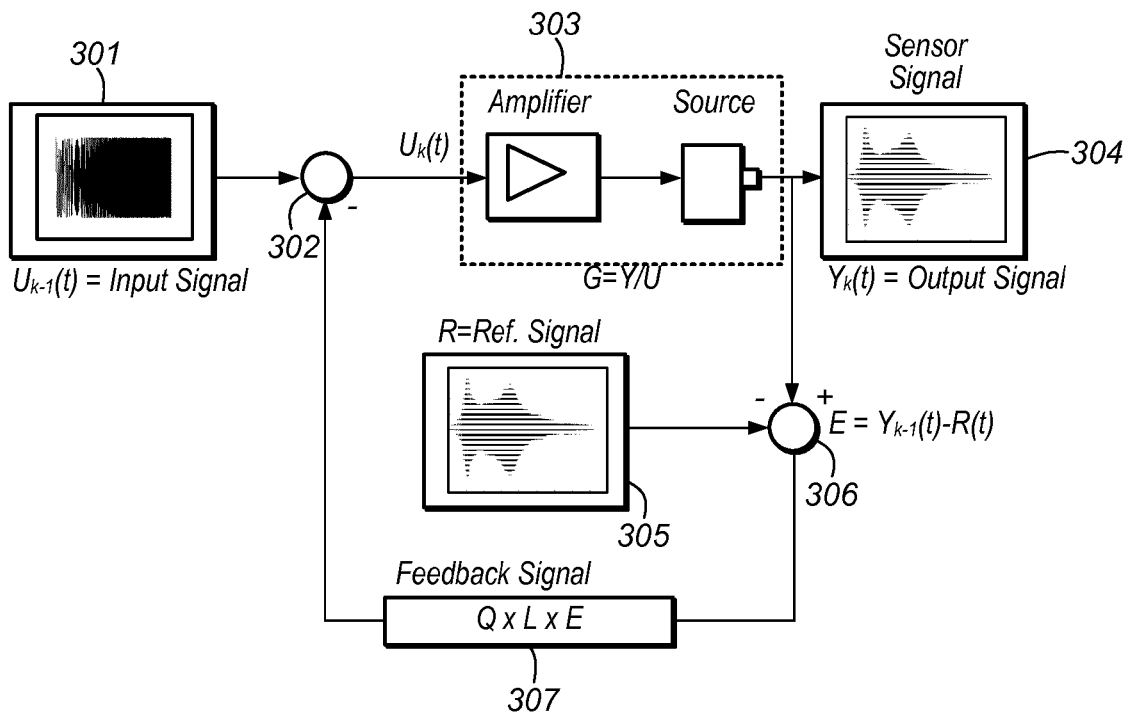
FIG. 14 illustrates an example of a control system for driving one actuator according to one embodiment.

Turning now to FIG. 14, one embodiment of an ILC system is shown. Signal generator 301 may provide an initial form of the seismic signal to be generated by the vibrator, for example, a linear sweep in the range of 10 to 100 Hz. Signal generator 301 may form part of recording system 16 from FIG. 1. The functional components of the ILC system may also be performed on a general purpose computer forming part of the recording system or on another computer. The output of signal generator 301 may be coupled to summing amplifier 302 which also receives as input a correction signal generated by the ILC (explained below). The output of summing amplifier 302, which may be referred to as a "corrected driver signal" may be coupled to a power amplifier, which drives the vibrator. The vibrator may have coupled to it two or more sensors (see FIGS. 12 and 13) as explained above. Collectively, the power amplifier, vibrator, and sensors are shown at box 303. For purposes of this figure, it should be understood that the "Source" refers to both the vibrator itself as well as the sensors. One sensor output is shown in FIG. 14 for simplicity of the illustration; however, the same principle and components may apply to each of the sensors. The output of one of the sensors is shown at sensor output signal 304, and it represents the input signal convolved with the transfer function of the vibrator at the point of measurement. Sensor output signal 304 may be used at circuit 306 to subtract or compare (e.g., determine a difference) with reference signal 305, which may be a desired vibrator output signal. At circuit 307, the difference between sensor output signal 304 and reference signal 305 is combined to generate an error correction signal. The error correction signal is conducted to summing amplifier 302 as explained above.

Operation of the ILC may be explained as follows: Iterative learning control (ILC) is a method of tracking control for systems that work in a repetitive manner. Some examples of systems that operate in a repetitive manner include robot arm manipulators, chemical batch processes, reliability testing rigs, and in this case marine vibrators. In each of these tasks, the system typically performs the same action over and over again with high precision.

By using information from previous repetitions, a suitable control action can found iteratively. The internal model principle yields conditions under which essentially perfect tracking can be achieved.

An inverted model L of the system's transfer function can be made of the vibrator system. The same initial driver signal, referred to as u, may be repeated a selected number of times. After each iteration of the ILC system, the input driver signal u to the ILC system may be updated. The ILC system uses a reference signal, designated r, to compare with the output y from the vibrator system. The difference between the vibrator system output y and the reference signal r, denoted by e, can then be filtered by the inverted model (using, for example, a causal and a non-causal filter) and added to the input of the ILC system (e.g., at summing amplifier 302). The ILC system is iterated, and if the ILC system's transfer function does not change faster than the update to the input driver signal the error e will decrease with respect to time.

The desired result of operating the ILC system is that the error tends toward zero over time, that is, $e_k(t) \to 0$ when $k \to \infty$. For each iteration of the ILC system (k=k+1), $u_{k+1}(t) = u_k(t) + L^*e_k(t)$. The vibrator output may be described by the expression $y_k(t) = G^*u_k(t)$. The iterative process of the ILC may be described by the following expressions:

$$e_{k+1}(t) = r - G^*u_{k+1}(t) =$$
$$r - G^*(u_k(t) + L^*e_k(t)) = r - G^*u_k(t) - GL^*e_k(t) = (1 - GL)e_k(t)$$
$$e_k(t) \to 0 \text{ if } (1 - G(i\omega)L(i\omega)) < 1 \text{ for all } \omega.$$

Where * denotes the convolution operator, i represents the square root of (−1), and ω represents angular frequency. G and L represent, respectively, the system transfer function and the inverse system transfer function. $G(i\omega)$ and $L(i\omega)$ may typically not be known for all frequencies, because they are not measured at all frequencies. Therefore, a bandpass filter Q may be applied to filter out the unknown frequencies (i.e., those frequencies not measured by the sensors shown in FIGS. 12 and 13). This can be performed as follows:

Set $u_{k+1} = Q_1 * (u_k + Q_2 L^* e_k)$.

Then it is possible to obtain stable ILC operation if $Q_1(i\omega)(1 - Q_2 G(i\omega) L(i\omega)) < 1$ is satisfied for all ω

For a converged ILC, $u_{k+1} = u_k$ which gives $u = Q_1 * (u + Q_2 L^* e)$ from which may be obtained $(1 - Q_1) * u = Q_1 Q_2 L^* e$. To calculate the stationary error e, the following may be used:

$$e = r - G^*u = r - GQ_1Q_2L/(1-Q_1)^*e$$

which gives $$e = (1 - Q_1)/(1 - Q_1 + Q_1Q_2GL)^*r$$

The state space error e is zero for any ω when $Q_1(i\omega) = 1$. The foregoing uses the assumption that the driver signal becomes time invariant after a selected number of iterations, that is, $u_{k+i} = u_k$. To obtain a slowly varying adaptation and ultimate cessation of change of $u_{k+1}$, the gain factor $Q_2$ may be used. If the vibrator system is non-linear and if the change for each iteration is large, it could change the transfer function too quickly and the control system may not converge as suggested above. Non-convergence may also occur if the vibrator system changes the transfer function faster than the time for each iteration. During the testing of the foregoing ILC system, gain factors of $Q_1 = 1$, $Q_2 = 0.3$ were found to provide a good result. To handle the harmonics, the control system typically will have a bandwidth of 1,000 Hz even if the seismic signal generated by the vibrator system is typically 100 Hz or lower. It may be advantageous to measure the system transfer function to 1,000 Hz to be able to attenuate harmonics up to 1,000 Hz. If it is desired to attenuate harmonics up to 2,000 Hz, the control system bandwidth may be adjusted accordingly. Bandwidth may include, among other parameters, the frequency range of the sensors shown in FIG. 12 and FIG. 13, the frequency range of reference signal 305 in FIG. 14, and the frequency range of the corrected driver signal.

The foregoing procedure may in some cases be implemented in the frequency domain. It has been observed that certain frequencies can be absent in the output of one or more of the sensors shown in FIG. 12 and FIG. 13, particularly at frequencies above the second resonance (second resonance frequency 112 in FIG. 7). Zero values at certain frequencies may make the ILC system unstable, because the error function in the frequency domain includes division (which would be division by zero at the zero amplitude frequencies). By adding the output of the second sensor, the presence of zero amplitude frequencies in the combined sensor output may be substantially eliminated, making implementation of the foregoing system stable in the frequency domain.

Figure 15:
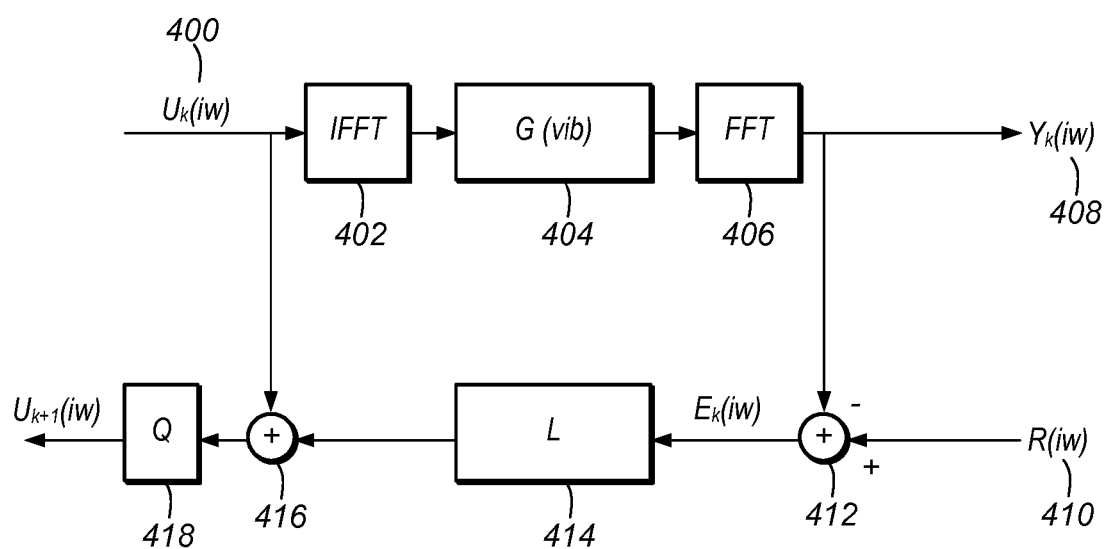
FIG. 15 illustrates an example of a control system for one actuator operating in a frequency domain according to one embodiment.

An example implementation of the foregoing procedure in the frequency domain is shown schematically in FIG. 15, wherein desired driver signal 400 in the frequency domain may be transformed to the time domain such as by inverse fast Fourier transform at IFFT 402, to provide an analog driver signal to operate the vibrator, at analog vibrator signal 404. Output of the sensors (e.g., those shown in FIG. 12 and in FIG. 13) may be transformed to the frequency domain such as by fast Fourier transform at FFT 406 to provide a representation of the actual vibrator output 408 in response to the input driver signal. Reference signal 410 may be combined with the FFT sensor output at circuit 412 to generate an error signal. A correction term is then determined at circuit 414 from the error signal. The correction term may be summed at circuit 416 with the driver signal to generate at output 418 the subsequent driver signal.

Expressed mathematically (where capital letters represent the frequency domain):

$$U_{k+1}(i\omega)=Q_1(i\omega)(U_k(i\omega)+Q_2L(i\omega)*(R(i\omega)-Y(i\omega)))$$

where $L(i\omega)$ is an approximate matrix inverse to the matrix $G(i\omega)$.

The stability criteria may be evaluated similarly as explained above with reference to the time-domain ILC system:

$$\|Q_1(i\omega)(1-Q_2G(i\omega)L(i\omega))\|<1$$

A particular advantage to using more than one sensor as input to the ILC is the low probability of having zero amplitude at any single frequency in the seismic frequency range of interest plus harmonics thereof. By substantially eliminating zero amplitude frequencies, implementation of the ILC in the frequency domain is improved by reducing instances of division by zero.

Figure 17:
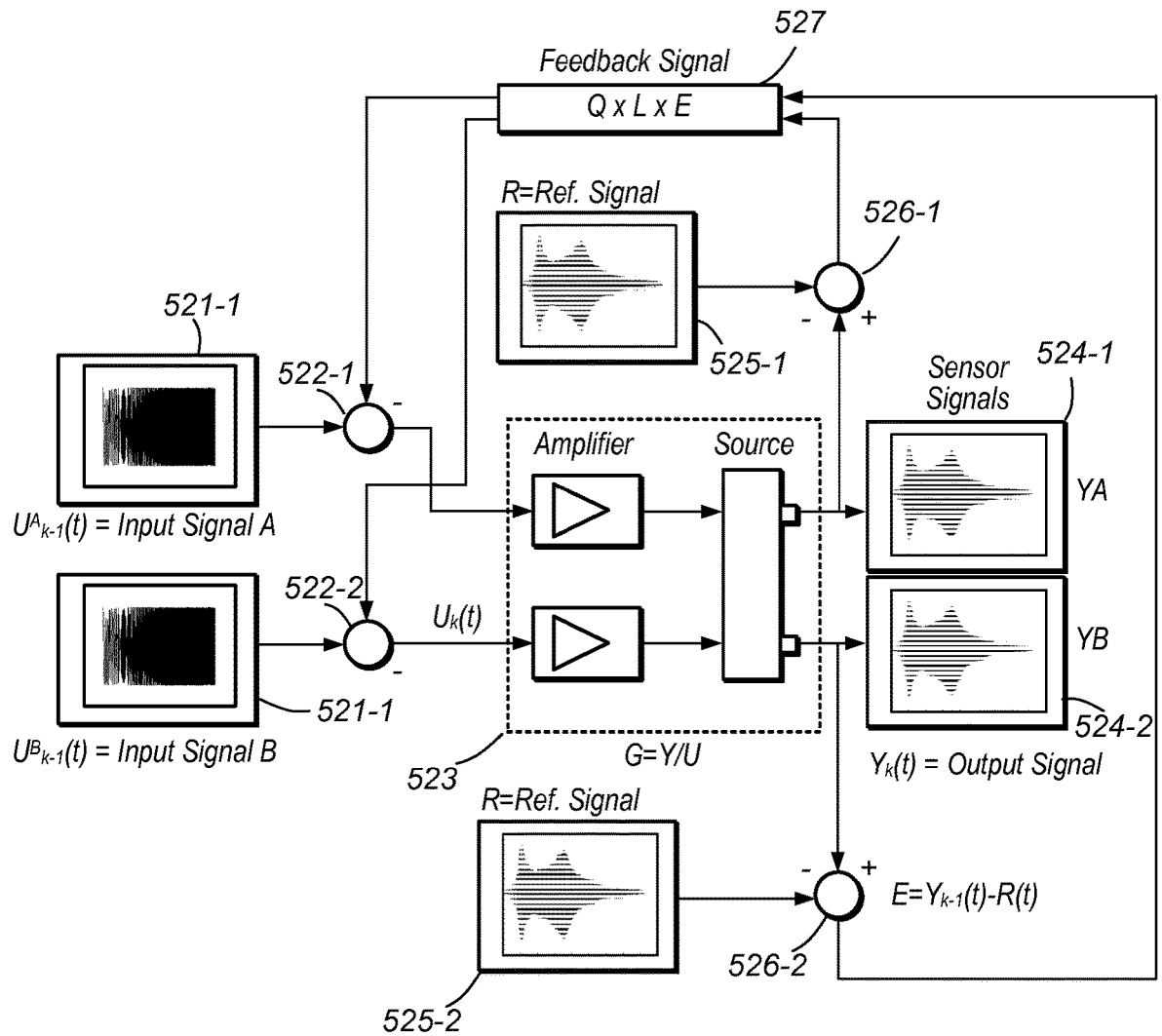
FIG. 17 illustrates an example of a two channel control system configured to handle mechanical cross-coupling between actuators according to one embodiment.

Using more than one sensor in combination with individually controllable actuators may provide the ability to control transducer output deflection at more than one location on the shell. FIG. 17 shows an example of a control system for a vibrator with two actuators (e.g., one for each side of the vibrator) driven by two amplifiers, detecting output shell deflection with two sensors (e.g., one on each side) used for feedback control. As can be seen, the functionality of FIG. 17 is generally similar to that of FIG. 14. The main difference is that two output signals may be measured, and two actuator signals may be corrected, based on knowledge about the coupling between each combination of input driver signal and each sensor signal. Compared to FIG. 14, corresponding reference numerals have been used: signal generators 521-1 and 521-2 correspond to signal generator 301; summing amplifiers 522-1 and 522-2 correspond to summing amplifier 302; box 523 corresponds to box 303; sensor output signals 524-1 and 524-2 correspond to sensor output signal 304; circuits 526-1 and 526-2 correspond to circuit 306; reference signals 525-1 and 525-2 correspond to reference signal 305; and circuit 527 corresponds to circuit 307.

The two control signals may be collected in the vector $$u = \begin{pmatrix} u1 \\ u2 \end{pmatrix},$$

and the two sensor signals in the vector $$y = \begin{pmatrix} y1 \\ y2 \end{pmatrix}.$$

The matrix L is a two-by-two matrix approximating an inverse of the matrix G. For $Q_1=I$ and a frequency-dependent gain $Q_2(i\omega)$, the update equation becomes $U_{k+1}(i\omega)=U_k(i\omega)+Q_2(i\omega) L(i\omega)*(R(i\omega)-Y(i\omega))$.

The mechanical coupling between the two sides may be significant in some embodiments. An adjustment of the input signal to one actuator may change the output signal on both sides, particularly at higher frequencies. It is in most cases possible to determine two input signals that will generate the desired output signal on both sides. In general, in the frequency domain the system transfer function from the m sensor inputs to the n actuator outputs will be given by an m×n matrix at each frequency. For example, for two inputs and two outputs, the matrix will be a 2×2 matrix $$L(i\omega) = \begin{pmatrix} L11 & L12 \\ L21 & L22 \end{pmatrix}$$

for each frequency. Although it may be possible to have a system with m<n, it may be advantageous to have m≥n in order to allow sufficient control.

Figure 16:
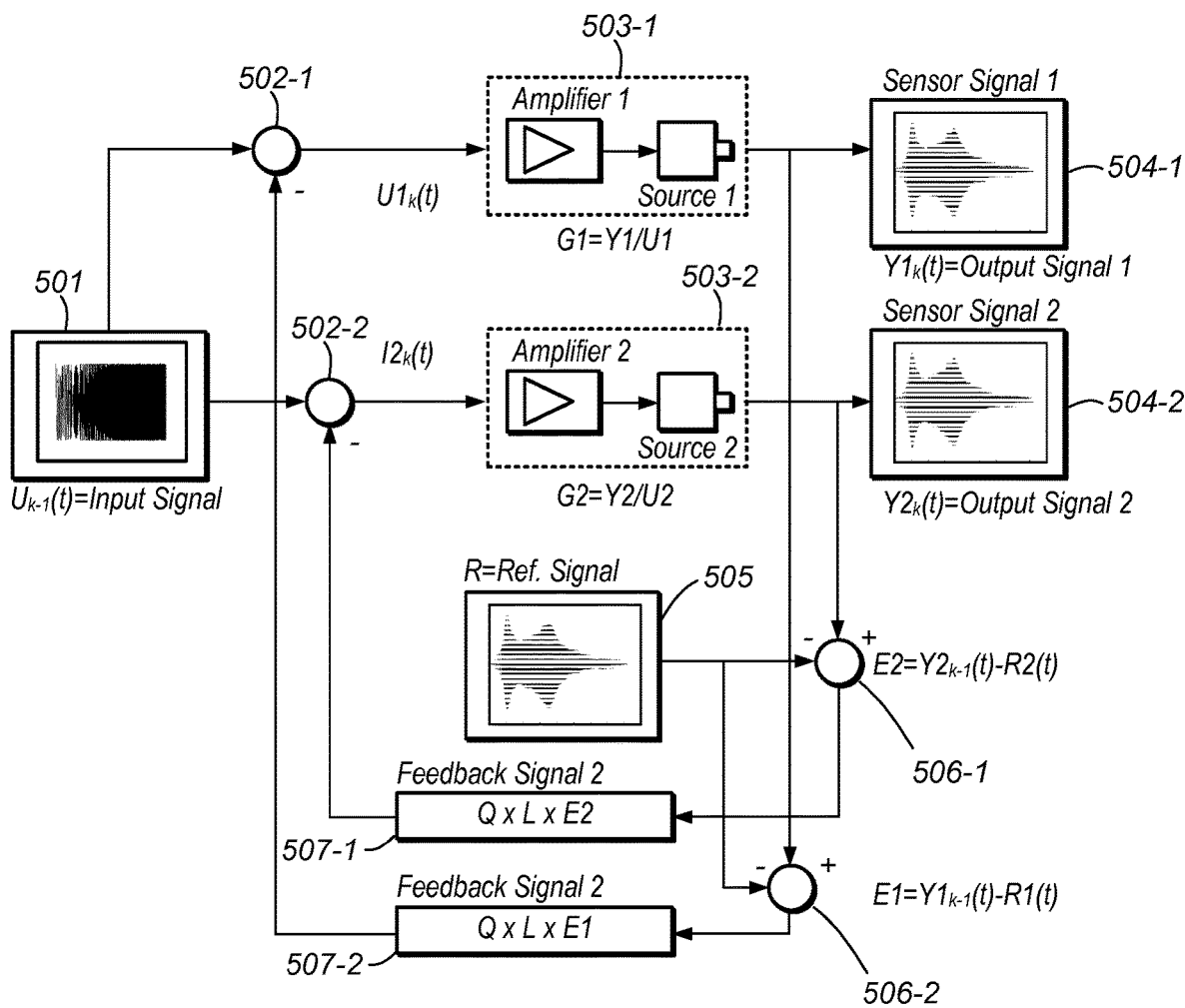
FIG. 16 illustrates an example of a control system in which two drivers are operated by two iterative learning control (ILC) systems according to one embodiment.

This transfer function matrix consists of complex numbers representing the phase and amplitude response for each combination of input and output. In this example, the diagonal elements L11, L22 in this matrix will respectively represent the transfer function from the left side actuator to the left side sensor, and the transfer function from the right side actuator input to the right side sensor. The other two elements L12 and L21 give the cross coupling between the left side actuator input, and the right side sensor and vice versa. For each frequency component, the two input signals can be determined if the transfer function matrix $G(i\omega)$ is invertible. The 2×2 matrix G in this example can be inverted if the determinant is not equal to 0. This will for example typically be the case when the direct coupling is much stronger than the cross coupling or vice versa. The same approach can be extended to all frequencies controlled, and to other configurations with more than two sensors and two actuators. The number of available actuator inputs will determine the maximum number of output sensor locations that can be controlled independently. If mechanical cross coupling is low, two independent ILC controllers can be used as shown in FIG. 16. This means that the matrix L is diagonal, i.e., it has the form $$L(i\omega) = \begin{pmatrix} L11 & 0 \\ 0 & L22 \end{pmatrix}.$$

In both cases, the $Q2(i\omega)$ is a scalar gain function in the range 0 to 1 increasing the robustness of the algorithm. A good choice has been found in some embodiments to be Q2=0.3.

A marine vibrator system operated using two or more sensors as input for an ILC system may provide more stable control over the spectral content and better rejection of harmonics than systems using only a single sensor to control the ILC.

In FIG. 16, two independent ILC controllers similar to the controller of FIG. 14 are shown. Signal generator 501 may provide an initial form of the seismic signal to be generated by the vibrators, for example, a linear sweep in the range of 10 to 100 Hz. The output of signal generator 501 may be coupled to summing amplifiers 502-1 and 502-2 which also receive as input respective correction signals generated by the ILC (explained below). The output of summing amplifiers 502-1 and 502-2, which may be referred to as "corrected driver signals" may be coupled to a power amplifier, which drives the vibrator. The vibrator may have coupled to it two or more sensors (see FIGS. 12 and 13) as explained above. Collectively, the two sets of power amplifiers, vibrators, and sensors are shown at boxes 503-1 and 503-2. For purposes of this figure, it should be understood that the "Source 1" and "Source 2" refer to both the vibrators themselves as well as the sensors. The output of the sensors is shown at sensor output signals 504-1 and 504-2, which represent the input signal convolved with the transfer function of the vibrators at the point of measurement. Sensor output signals 504-1 and 504-2 may be used at circuits 506-1 and 506-2 to subtract or compare (e.g., determine a difference) with reference signal 505, which may be a desired vibrator output signal. At circuits 507-1 and 507-2, the differences between sensor output signals 504-1 and 504-2 with respect to reference signal 505 are combined to generate error correction signals. The error correction signals are conducted to summing amplifiers 502-1 and 502-2 as explained above.

As discussed above, ILC control in some embodiments uses a model of the transducer in order to compute the corrections to be applied iteratively to the input actuator signals. In one embodiment, initial values for this model may be generated by performing an initial transfer function measurement of the transducer prior to ILC control start. The transfer function typically depends on drive amplitude and the type of signals used for this measurement. Low-frequency, high-amplitude signals may be used to keep transducer parts moving while measuring low amplitude response at higher frequencies. The approach may reduce the effect of sticking and assure that the measured data represents an average transfer function suitable for all deflections expected during normal operation. The low-frequency, high-amplitude signal may have a lower frequency and a higher amplitude than the excitation signal that is being measured for the purpose of generating the initial model. According to one embodiment, the low-frequency, high-amplitude signal may be in the lower-frequency portion of the audio band (or below the audio band) and that have an amplitude in the same range as typical operational amplitudes.

The corrections signal required during normal operation are, at higher frequencies above the audio band, typically of low amplitude relative to the high power signals used to create the desired seismic signal in the audio band. The phase error in the transducer model used for ILC may be less than ±90 degrees for all frequencies used in the control band. In some embodiments, not all frequencies need be used—e.g., certain frequencies may be skipped, and ILC may be performed on other frequencies. For all frequencies used for ILC, however, the phase error in the transducer model may be less than ±90 degrees. It has been found that the phase and amplitude measurements at higher frequencies (e.g., above the seismic audio band) are dependent on the signal transmitted in the seismic band.

Static friction is defined as the friction between two or more solid objects that are not moving relative to each other. Dynamic friction occurs when two objects are moving relative to each other and rub together. The static friction is often larger than the dynamic friction. The actuators according to this disclosure may perform a reciprocating motion when a single frequency is applied to the actuator. This means that the actuator velocity may be equal to zero two times during a period of the applied frequency. Each time this occurs, some sticking may occur, which can affect the transfer function measurement. Applying a low-frequency, high-amplitude signal simultaneously with the high frequency may reduce the number of stand-stills.

Figure 18:
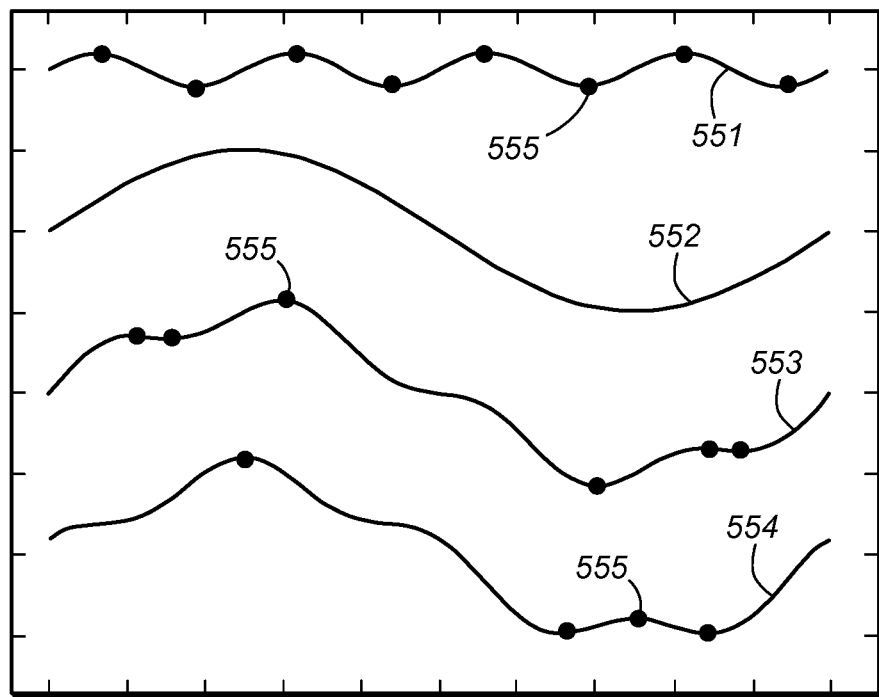
FIG. 18 illustrates a graph of transducer response at different driving frequencies according to one embodiment.

One embodiment of adding such a low-frequency, high-amplitude signal may be seen in FIG. 18. Various plots of driver displacement vs. time are shown over a duration of 10 ms. High-frequency signal 551 shows the displacement of the driver excited with a 400 Hz signal with amplitude 0.2. It can be seen that if only this 400 Hz signal is applied to the driver, it will reach 8 stand-stills 555. When a 100 Hz low-frequency signal 552 with amplitude 1.0 is added to the high-frequency signal 551, combined signals 553 and 554 that may result will contain a smaller number of stand-stills 555 (e.g., 4-6) compared to when only the high frequency signal is used. The curves shown in combined signals 553 and 554 contain the same two frequencies, with the same amplitude. The phase of the 400 Hz has been changed 90 degrees between combined signals 553 and 554. It can be seen that the phase between the two signals may affect the number of stand-stills 555 that will occur.

Figure 19:
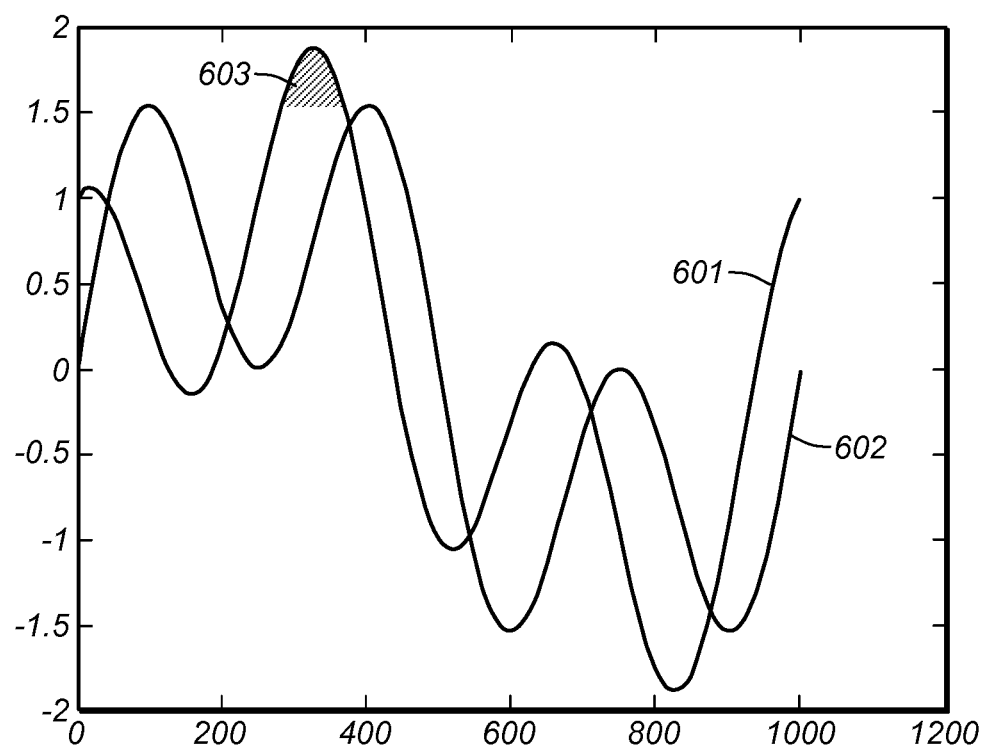
FIG. 19 illustrates a graph of transducer response at different phase offsets according to one embodiment.

To illustrate the effects of phase offset, FIG. 19 shows a graph of two drive signals 601 and 602 that both contain a 100 Hz signal and a 300 Hz signal with the same amplitude. The phase of the 300 Hz signal differs by 90 degrees. As can be seen, the peak amplitude differs significantly. For a non-linear vibrator, the phase between different frequency components in the signal may be important. If the transducer saturates or reaches a mechanical limit at some high drive amplitude as shown at peak 603, the measured transfer function may differ from the drive condition given by drive signal 602, which has lower peak amplitude.

Friction is typically not uniform over the deflection cycle of the transducer. It may be advantageous for the model to reflect the behavior of the transducer as its parts move in all used positions during a deflection. A high-amplitude, low-frequency signal can be used to assure that the high frequency transfer function measurements are recorded using all deflections used by the actuators during normal operation.

Mechanical play in hinges may have a non-linear influence and affect the transfer function. At high frequencies, typically small signal amplitudes will be required for the correction applied during ILC operation. Applying signals of similar amplitude during the initial transfer function measurements can lead to significant errors. If the mechanical play is equal to or greater than the excitation amplitude used during transfer function measurement, the sensor output signals will be close to zero, making the transfer function measurement unreliable.

A non-linearity in the marine vibrator may generate harmonics and/or intermodulation frequencies. The frequency contents of the signals used for the transfer function measurement may be chosen, however, no that harmonics and intermodulations do not coincide with the frequency to be measured.

One or more low-frequency, high-amplitude signals (e.g., with amplitudes as close as practically possible to the amplitude used during normal transmission) may be used to keep transducer parts moving through the full deflection cycle while measuring the low-amplitude response at higher frequencies. This approach may reduce the effect of sticking and assure that the measured data represents an average transfer function suitable for all deflections expected during normal operation.

The input signal u_tot(t) used for transfer function measurement can be chosen as $$u\_tot(t)=p(t)+u\_0(t)$$

where $p(t)=A\_p \sin(2\pi f\_p\ t)$ is a high-amplitude, low-frequency signal, and where $u\_0\ (t)=a \sin(2\pi r\ f\ t+phi)$ is an excitation signal used to find the transfer function at frequency f. To make sure there is no interaction between the harmonics of signal p(t) and the signal u_0, it may be advantageous to ensure that there is no integer N such that N*f_p=f. This can be done by changing frequency f_p slightly, for instance finding an N such that (N+0.5)f_p=f, minimizing the deviation between the resulting f_p and some target frequency f_p,target.

The low-frequency signals may be applied to all actuators simultaneously, whereas the high-frequency signal may be applied only to one actuator at a time when the transfer functions are measured.

According to some embodiments, the accurate control of the far-field output from a marine vibrator is important for its usefulness in acquiring seismic data. For lower frequencies, the vibrator will generally be small compared with the wavelength. It has been shown above in Eqs. 1-10 that the marine vibrator will operate with reactive loading from the water. The impedance caused by the water surrounding the marine vibrator is generally frequency-dependent.

Within the near-field of a vibrator (e.g., where the effects of surfaces generally working partly out of phase may be important), a measurement at one (close) radial distance may not relate directly to measurements at greater distances in the same direction by the law of spherical spreading.

The pressure spectrum recorded with a near-field hydrophone may therefore not be the same as a spectrum recorded with a far-field hydrophone.

Figure 20:
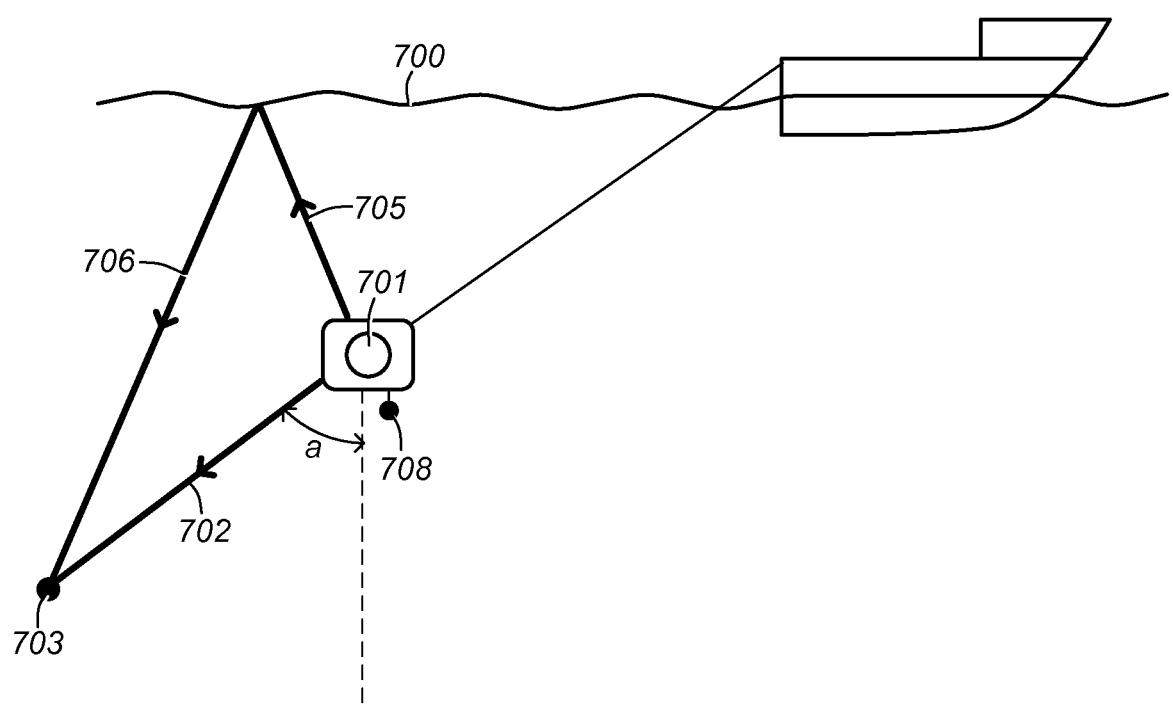
FIG. 20 is a diagram illustrating one embodiment of a geophysical survey system.

Turning now to FIG. 20, a schematic diagram of the paths of vibrator signals is shown. Marine vibrator 701 is towed by a vessel in a body of water. Marine vibrator 701 includes local sensor(s) 708, and remote sensor(s) 703 are placed at a more distant location. Upward going energy shown at path 705 that hits sea surface 700 may be reflected downwards along path 706 to remote sensor(s) 703. Marine vibrator 701 may therefore advantageously be operated at a depth corresponding to approximately one quarter of the wavelength at the center frequency of the marine vibrator output, in order to obtain constructive interference and maximize energy output in the vertical direction downwards. The phase of the reflected signal relative to the direct signal will depend on the frequency and the observation angle "a" in FIG. 20. At higher frequencies, the difference in path length between direct path 702 and the reflected path (that is, paths 705 and 706) may be significant compared with the wavelength. A measured spectrum at remote sensor(s) 703 may contain a ripple in the frequency caused by the interaction between the energy received directly from marine vibrator 701, versus energy reflected via the sea surface.

The acoustic amplitude and phase spectrum may therefore depend on where it is measured. The acoustic output from the vibrator may therefore be measured at a distance large compared with the size of the marine vibrator at remote sensor(s) 703. At the same time, the output is recorded with local sensor(s) 708 on, in, or near the vibrator. The transfer function G_ld(f) from local sensor(s) 708 to remote sensor(s) 703 is computed. The inverse transfer function L_dl(f) may be computed as 1/G_ld(f).

A predetermined output signal Y_far to be generated in the far-field in the direction "a" is multiplied with inverse transfer function L_dl(f) in order to obtain the desired output signal(s) Y_d_loc for local sensor(s) 708. The ILC algorithm may then iteratively adjust the marine vibrator actuator input signals until the output Y_loc of the local sensor(s) is equal to Y_d_loc.

Another advantage of some embodiments of this disclosure is the ability for the ILC to handle impulsive sources (e.g., air guns) in close proximity to the marine vibrator sources and sensors.

In areas where the marine vibrator is operating close to air guns and/or other impulsive sources, the ILC system may advantageously handle these other pulses. The marine vibrator will typically repeatedly transmit relatively long pulses with (for example) 30-100 seconds duration. Several types of waveforms may be used, for example a frequency sweep over the frequency band of the marine vibrator (a chirp). The same low-frequency vibrator waveform may typically be repeated more or less continuously.

Air guns, in contrast, typically transmit discrete pulses or shots, for example, every 10 seconds. The exact triggering of air gun shots may typically be determined based on the ship position (typically determined via GPS). For example, air gun shots are typically made at spatially evenly distributed positions. The marine vibrator transmission may therefore advantageously be de-synchronized from the air gun shooting, so that air gun pulses typically do not appear in the same location in time, with respect to the transmitted signal from the marine vibrator.

The marine vibrator ILC system in the presence of impulsive sources such as air guns may use the fact that the same signal (or set of signals) is generally repeated over and over again.

As described above, the control system may measure the actual output into the water and then calculate an adjustment to the next input signal for the actuator drivers, so that the next output signal will be closer to the desired output, as compared with the current output measured. In order for the iterative control system to work well, the vibrator output thus should be measured accurately.

Certain parts (in the time domain) of the measured output signal of the marine vibrator may contain interfering energy from air-gun pulses. These parts can be identified in several ways. Air gun trigging signals and known propagation delays can be used in some embodiments. It is also possible to detect these signals by looking at the error signal in the control system. The error signal will typically be large for time segments when the output sensors pick up unwanted signals from air gun pulses. This means that when a sudden increase is observed in the error signal at a specific time interval, it may be a likely indication of interfering signals from example air guns or some other impulsive source, rather than a sudden problem within the control of the vibrator.

The iterative control system can in some embodiments be set to apply corrections more slowly, and ignore parts of the signal where interference is present. For example, it does not need to correct all parts of the waveform in one iteration. It is thus possible to let the ILC system work on only the time segments where no interfering energy is present in the sensor signals.

The ILC may thus be able to control all parts of the output signal, given that it can accurately measure all parts of the signal, but it does not need to do this in each iteration, i.e. for every single transmission of the waveform. Accordingly, it may be advantageous to assure that interfering air gun pulses do not occur repeatedly at the same location (position in time), referenced to the beginning of the marine vibrator transmission. That is, the air gun pulses and the marine vibrator transmissions may be de-synchronized.

The marine vibrator system may therefore be de-synchronized from the air gun transmission system. This can be done in several ways. One embodiment starts sending the vibrator signal after a random delay (e.g., 0-10 seconds), after air guns are transmitting.

Another embodiment sets the vibrator pulse lengths so that they are not an even multiple of the time between air gun pulses. If, for example, air gun pulses are transmitted every 10 seconds, and the vibrator sends a 33 second pulse repeatedly, the air gun pulses may not occur at the same position in time in each recording of the output of the marine vibrator output signal. This may be sufficient to assure that the ILC algorithm can measure all parts of the output signal some of the time.

To detect the presence of air gun pulses (or other large intermittent disturbances) and to minimize the detrimental effect on the ILC algorithm, the following method can be used in one embodiment.

First, calculate the error signal e(t)=r(t)−y(t) as the difference between the wanted signal r(t) and measured signal y(t) over the measurement interval [0; T]. If several sensors are used e, r and y may be vector valued. The outlier detection signal d(t) is calculated as a convolution between a suitable window function w(t) and the absolute value of the error signal e(t), and normalized with the total error energy. For example, it may be expressed as follows:

$$d(t) = \frac{\int w(t-\tau)|e(\tau)|d\tau}{\int_0^T |e(\tau)|d\tau}$$

If e is a vector-valued quantity, the momentaneous error energy may be used:

$$|e|=(\Sigma e_k^2)^{1/2}$$

One possible choice of window function is a rectangular boxcar function, giving:

$$d(t) = \frac{\int_{t-\Delta}^{t+\Delta} |e(\tau)|d\tau}{\int_0^T |e(\tau)|d\tau},$$

where a suitable value of Δ is related to the expected length of the disturbance (for example 100 milliseconds), and T is the total duration of the transmitted signal (for example 10 seconds). This "robustification" will change the error signal e(t) to a robustifed version $e_r(t)$ as follows:

$$e_r(t) = \begin{cases} e(t) & \text{if } d(t) < d_{threshold} \\ 0 & \text{if } d(t) > d_{threshold} \end{cases}$$

Here, $d_{threshold}$ is a parameter determining what level of disturbance will be considered abnormal. The robustifed error signal $e_r(t)$ is then replacing the error signal e(t) in the ILC algorithm.

If the update of control signal is done in the frequency domain it may thus take the form:

$$U_{k+1}(i\omega)=Q_1(i\omega)(U_k(i\omega)+Q_2L(i\omega)E_r(i\omega)),$$

where $E_r(i\omega)$ is the FFT of the robustified time domain signal $e_r(t)$.

Turning now to FIGS. 21-24, various process flows according to embodiments of this disclosure are shown.

Figure 21:
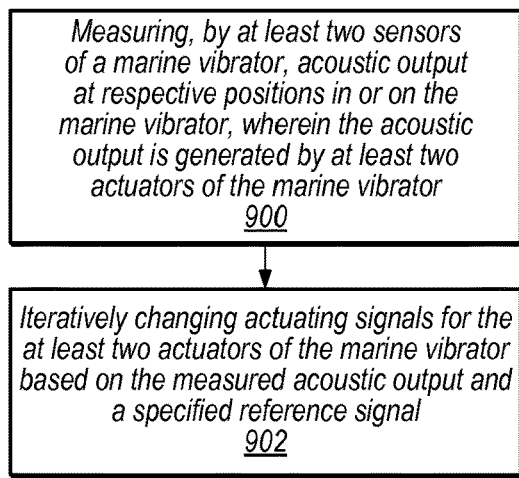
FIG. 21 is a flowchart of a method for controlling a marine vibrator via multiple actuators using ILC according to one embodiment.

FIG. 21 is a flowchart of a method for controlling a marine vibrator via multiple actuators using ILC according to one embodiment. Flow begins at step 900.

At step 900, acoustic output is measured by at least two sensors of a marine vibrator. For example, the sensors may be at respective positions in or on the marine vibrator. The acoustic output measured by the sensors may be generated by the marine vibrator. Flow proceeds to step 902.

At step 902, actuating signals for the marine vibrator are iteratively changed based on the measured acoustic output and a specified reference signal. For example, the specified reference signal may be a desired output for the marine vibrator. Flow ends (or in some embodiments repeats) at step 902.

Figure 22:
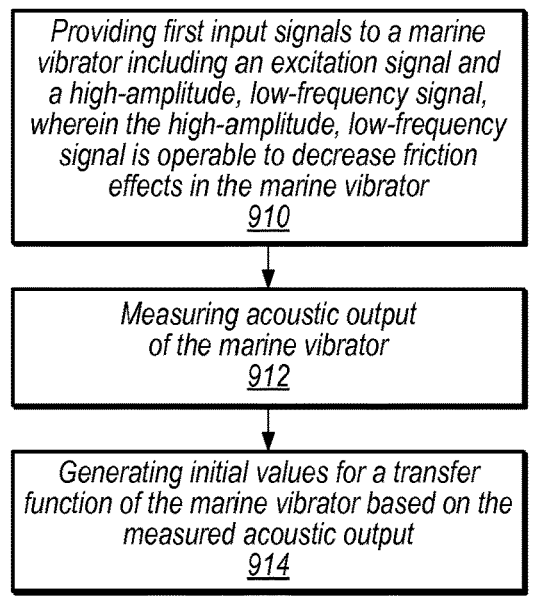
FIG. 22 is a flowchart of a method for calibrating a marine vibrator using ILC in the presence of air guns or other impulsive sources according to one embodiment.

FIG. 22 is a flowchart of a method for using low-frequency signals to reduce the effects of static friction. Flow begins at step 910.

At step 910, first input signals are provided to a marine vibrator. The first input signals may include an excitation signal and a high-amplitude, low-frequency signal operable to decrease friction effects in the marine vibrator. Flow proceeds to step 912.

At step 912, the acoustic output of the marine vibrator is measured. For example, this measurement may be carried out via one or more sensors in or on the marine vibrator, and/or one or more sensors in a far-field region of the marine vibrator. Flow proceeds to step 914.

At step 914, initial values for a transfer function of the marine vibrator are generated based on the measured acoustic output from step 912. Flow ends at step 914.

Figure 23:
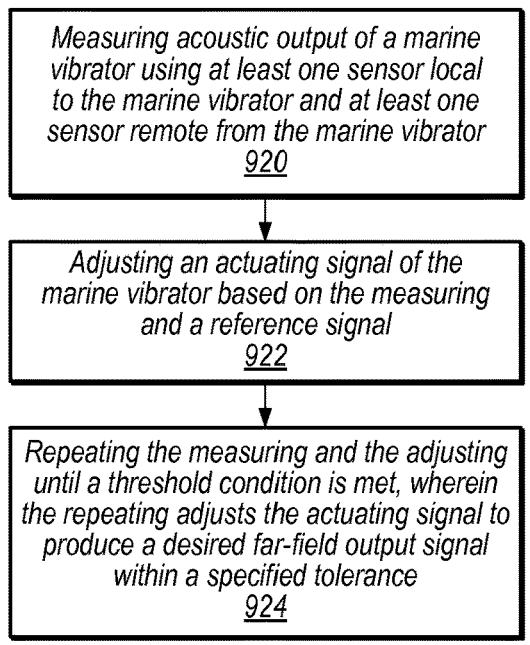
FIG. 23 is a flowchart of a method for calibrating a marine vibrator using ILC based on a transfer function between near-field and far-field measurements according to one embodiment.

FIG. 23 is a flowchart of a method for calibrating a marine vibrator using ILC based on a transfer function between near-field and far-field measurements. Flow begins at step 920.

At step 920, the acoustic output of a marine vibrator is measured. The measurement may be carried out via at least one sensor local to the marine vibrator and at least one sensor remote from the marine vibrator. For example, the local sensor may be located in, on, or near the marine vibrator. The remote sensor may be located in a far-field region of the marine vibrator. Flow proceeds to step 922.

At step 922, an actuating signal of the marine vibrator is adjusted based on the measurements of step 920 as well as a reference signal. The reference signal may be, for example, a desired output of the marine vibrator. Flow proceeds to step 924.

At step 924, the steps of measuring and adjusting (e.g., steps 920 and 922) are repeated until a threshold condition is met. For example, the repeating may adjust the actuating signal to produce a desired far-field output signal to within a specified tolerance. Flow ends at step 924.

Figure 24:
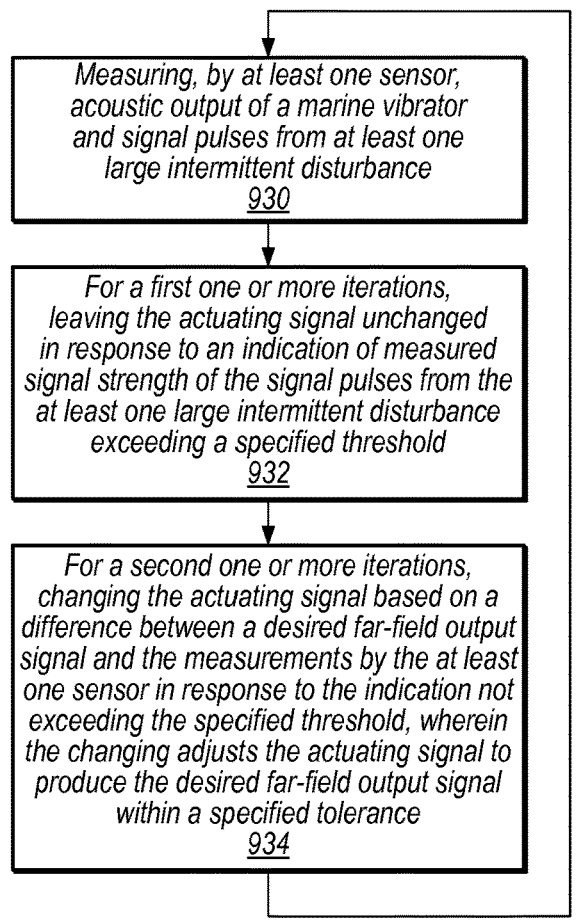
FIG. 24 is a flowchart of a method for operating a marine vibrator in conjunction with impulsive signal sources using ILC according to one embodiment.

FIG. 24 is a flowchart of a method for operating a marine vibrator in conjunction with impulsive signal sources (e.g., one or more air guns) using ILC. In general, this method may be applied to any large, intermittent disturbance. As shown, the method of FIG. 24 is an iterative method. Flow begins at step 930.

At step 930, at least one sensor measures the acoustic output of a marine vibrator and signal pulses from at least one large intermittent disturbance. Flow proceeds to step 932.

At step 932, for a first one or more iterations, the actuating signal is left unchanged in response to an indication that the measured signal strength of the signal pulses from the at least one large intermittent disturbance exceeds a specified threshold. For example, the indication that the measured signal strength of the signal pulses from the at least one large intermittent disturbance may indicate that an air gun is currently firing. Flow proceeds to step 934.

At step 934, for a second one or more iterations, the actuating signal is changed based on a difference between a desired far-field output signal and the measurements. The actuating signal may be changed in response to the indication not exceeding the specified threshold. As shown, the changing may adjust the actuating signal to produce the desired far-field output signal to within a specified tolerance. Flow ends at step 934.

While this disclosure has been described with respect to a limited number of embodiments, those skilled in the art, having benefit of this disclosure, will appreciate that other embodiments can be devised which do not depart from the scope of the claims as disclosed herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A system, comprising:
    a marine vibrator configured to generate acoustic output via at least one actuator;
    at least one sensor; and
    a control unit configured to iteratively change an actuating signal that is an active waveform, during operation of the marine vibrator, based on measurements by the at least one sensor of the acoustic output and of signal pulses from at least one impulsive seismic signal source;
    wherein to iteratively change the actuating signal, for each iteration of a plurality of iterations while the marine vibrator is emitting seismic energy, the control unit is further configured to:
        leave the actuating signal unchanged and operate the marine vibrator over a subsequent interval using the unchanged actuating signal, in response to an indication of measured signal strength of the signal pulses from at least one impulsive seismic signal source exceeding a specified threshold; and
        change the actuating signal based on a difference between a desired far-field output signal and the measurements by the at least one sensor in response to the indication not exceeding the specified threshold;
    wherein iteratively changing the actuating signal adjusts the actuating signal to produce the desired far-field output signal within a specified tolerance.

2. The system of claim 1, wherein to leave the actuating signal unchanged in response to the indication of measured signal strength of the signal pulses from the at least one impulsive seismic signal source exceeding the specified threshold, and to change the actuating signal based on a difference between the desired far-field output signal and the measurements by the at least one sensor in response to the indication not exceeding the specified threshold, the control unit is configured to:
    determine a first error signal that includes a difference between the desired far-field output signal and the measurements by the at least one sensor;
    determine the indication based on the first error signal;
    determine a second error signal based on the first error signal and the indication, wherein the second error signal is equal to zero when the indication exceeds the specified threshold, and is equal to the first error signal when the indication does not exceed the specified threshold; and
    change the actuating signal based on the second error signal.

3. The system of claim 2,
    wherein to determine the first error signal, the control unit is further configured to determine the difference between the desired far-field output signal and the measurements by the at least one sensor over a specified measurement interval; and
    wherein to determine the indication, the control unit is further configured to convolve a specified window function with an absolute value of the first error signal, and normalize the convolution with a total error energy of the first error signal.

4. The system of claim 2, wherein the at least one sensor includes a plurality of sensors, wherein the measurements by the at least one sensor include measurements by the plurality of sensors, and wherein the first error signal, the second error signal, the desired far-field output signal, and the measurements by the plurality of sensors are each vector-valued.

5. The system of claim 1, wherein the system is configured to:
    de-synchronize the acoustic output from the signal pulses from the at least one impulsive seismic signal source.

6. The system of claim 5, wherein the signal pulses from the at least one impulsive seismic signal source occur at a first specified frequency, and wherein to de-synchronize the acoustic output, the system is further configured to for at least one iteration, delay transmission of the acoustic output by a random offset.

7. The system of claim 5, wherein the signal pulses from the at least one impulsive seismic signal source occur at a first specified frequency, and wherein to de-synchronize the acoustic output, the system is further configured to generate the acoustic output with pulse lengths that are not even multiples of a time interval between the signal pulses from the at least one impulsive seismic signal source.

8. The system of claim 1, wherein the at least one actuator includes one or more of:
    an electrodynamic driver;
    a magnetostrictive driver;
    a piezoelectric driver; or
    a linear motor driver.

9. The system of claim 1, wherein the marine vibrator includes one or more of:
    a flextensional vibratory element;
    a bender vibratory element; or
    a piston vibratory element.

10. A method, comprising:
iteratively performing during operation of a marine vibrator while the marine vibrator is emitting seismic energy:
  measuring, by at least one sensor, acoustic output of the marine vibrator and signal pulses from at least one large intermittent disturbance;
  for a first one or more iterations, leaving an active waveform actuating signal for the marine vibrator unchanged and operating the marine vibrator over a subsequent interval using the unchanged actuating signal, in response to an indication of measured signal strength of the signal pulses from the at least one large intermittent disturbance exceeding a specified threshold; and
  for a second one or more iterations, changing the actuating signal based on a difference between a desired far-field output signal and the measurements by the at least one sensor in response to the indication not exceeding the specified threshold;
  wherein the changing adjusts the actuating signal to produce the desired far-field output signal within a specified tolerance.

11. The method of claim 10, wherein the leaving the actuating signal unchanged in response to the indication of measured signal strength of the signal pulses from the at least one large intermittent disturbance exceeding the specified threshold, and the changing the actuating signal in response to the indication not exceeding the specified threshold includes:
  determining a first error signal that includes a difference between the desired far-field output signal and the measurements by the at least one sensor;
  determining the indication based on the first error signal;
  determining a second error signal based on the first error signal and the indication, wherein the second error signal is equal to zero when the indication exceeds the specified threshold, and is equal to the first error signal when the indication does not exceed the specified threshold; and
  changing the actuating signal based on the second error signal.

12. The method of claim 11, wherein:
the determining the first error signal includes determining a difference between the desired far-field output signal and the measurements by the at least one sensor over a specified measurement interval; and
the determining the indication includes convolving a specified window function with an absolute value of the first error signal, and normalizing the convolution with a total error energy of the first error signal.

13. The method of claim 10, further comprising:
producing a geophysical data product based on the measured acoustic output.

14. The method of claim 10, further comprising:
measuring reflected output of the marine vibrator via at least one different sensor, wherein the reflected output has been reflected off of at least one geophysical formation; and
producing a geophysical data product based on the measured reflected output.

15. The method of claim 14, further comprising importing the geophysical data product onshore.

16. A marine vibrator, comprising:
at least one actuator configured to generate vibratory acoustic output in response to actuating signals; and
at least one sensor configured to measure the acoustic output and signal pulses from at least one impulsive seismic signal source;
wherein the actuating signals include, during operation of the marine vibrator while the marine vibrator is emitting seismic energy:
  an unchanged active waveform actuating signal when an indication of measured signal strength of the signal pulses from at least one impulsive seismic signal source exceeds a specified threshold; and
  a changed actuating signal when the indication does not exceed the specified threshold, wherein the actuating signal is changed based on a difference between a desired far-field output signal and the measurements by the at least one sensor.

17. The marine vibrator of claim 16, wherein the marine vibrator is further configured to de-synchronize the acoustic output from the signal pulses from the at least one impulsive seismic signal source.

18. The marine vibrator of claim 17, wherein the signal pulses from the at least one impulsive seismic signal source occur at a first specified frequency, and wherein to de-synchronize the acoustic output, the marine vibrator is further configured to for at least one iteration, delay transmission of the acoustic output by a random offset.

19. The marine vibrator of claim 17, wherein the signal pulses from the at least one impulsive seismic signal source occur at a first specified frequency, and wherein to de-synchronize the acoustic output, the marine vibrator is further configured to generate the acoustic output with pulse lengths that are not even multiples of a time interval between the signal pulses from the at least one impulsive seismic signal source.

20. The marine vibrator of claim 16, wherein the at least one actuator includes one or more of:
  an electrodynamic driver;
  a magnetostrictive driver;
  a piezoelectric driver; or
  a linear motor driver.

21. The marine vibrator of claim 16, wherein the marine vibrator includes one or more of:
  a flextensional vibratory element;
  a bender vibratory element; or
  a piston vibratory element.

22. The system of claim 1, wherein the at least one sensor includes a remote acoustic sensor placed in an acoustic far-field of the marine vibrator.

23. The system of claim 1, wherein in different iterations, the control unit is configured to change the actuating signal to control different time segments of the acoustic output.

* * * * *